(12) United States Patent
Kolich et al.

(10) Patent No.: US 8,071,688 B2
(45) Date of Patent: *Dec. 6, 2011

(54) BROMINATED ANIONIC STYRENIC POLYMERS AND THEIR PREPARATION

(75) Inventors: Charles H. Kolich, Baton Rouge, LA (US); John F. Balhoff, Baton Rouge, LA (US); Martin B. Berdon, Baton Rouge, LA (US); Ronny W. Lin, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/636,250

(22) Filed: Dec. 11, 2009

(65) Prior Publication Data

US 2010/0087620 A1    Apr. 8, 2010

Related U.S. Application Data

(62) Division of application No. 11/612,991, filed on Dec. 19, 2006, now Pat. No. 7,638,583.

(60) Provisional application No. 60/753,285, filed on Dec. 21, 2005.

(51) Int. Cl.
    *C08F 12/08* (2006.01)
(52) U.S. Cl. .................. 525/333.3; 525/333.4; 525/356; 525/357; 525/370; 525/355; 525/371; 525/359.2; 525/359.3; 525/359.4; 525/359.5; 525/359.6; 526/346; 526/237; 526/347.2
(58) Field of Classification Search ............... 525/333.3, 525/333.4, 356, 357, 370, 355, 371, 359.2, 525/359.3, 359.4, 359.5, 359.6; 526/346, 526/237, 347.2
See application file for complete search history.

(56) References Cited

U.S. PATENT DOCUMENTS

| 3,099,644 | A | 7/1963 | Parker et al. |
|---|---|---|---|
| 3,598,876 | A | 8/1971 | Bloch |
| 4,200,703 | A | 4/1980 | Diebel et al. |
| 4,360,455 | A | 11/1982 | Lindenschmidt et al. |
| 4,501,859 | A | 2/1985 | Newman et al. |
| 4,513,116 | A | 4/1985 | Kowalski et al. |
| 4,548,995 | A | 10/1985 | Kowalski et al. |
| 4,554,326 | A | 11/1985 | Kowalski et al. |
| 4,650,832 | A | 3/1987 | Kowalski et al. |
| 4,975,496 | A | 12/1990 | Tigner et al. |
| 5,055,235 | A | 10/1991 | Brackenridge et al. |
| 5,637,650 | A | 6/1997 | Gill et al. |
| 5,677,390 | A | 10/1997 | Dadgar et al. |
| 5,686,538 | A | 11/1997 | Balhoff et al. |
| 5,723,549 | A | 3/1998 | Dever et al. |
| 5,726,252 | A | 3/1998 | Gill et al. |
| 5,741,949 | A | 4/1998 | Mack |
| 5,767,203 | A | 6/1998 | Ao et al. |
| 5,852,131 | A | 12/1998 | Balhoff et al. |
| 5,852,132 | A | 12/1998 | Dadgar et al. |
| 5,916,978 | A | 6/1999 | Ao et al. |
| 6,133,381 | A | 10/2000 | Reed et al. |
| 6,207,765 | B1 | 3/2001 | Ao et al. |
| 6,232,393 | B1 | 5/2001 | Dadgar et al. |
| 6,232,408 | B1 | 5/2001 | Dadgar et al. |
| 6,232,939 | B1 | 5/2001 | Saito et al. |
| 6,235,831 | B1 * | 5/2001 | Reed et al. ................ 524/513 |
| 6,235,844 | B1 | 5/2001 | Dadgar et al. |
| 6,326,439 | B1 | 12/2001 | Dadgar et al. |
| 6,521,714 | B2 * | 2/2003 | Kolich et al. ............. 525/333.4 |
| 6,657,028 | B1 | 12/2003 | Aplin et al. |
| 6,958,423 | B2 | 10/2005 | Parks et al. |
| 6,992,148 | B2 | 1/2006 | Manimaran et al. |
| 7,202,296 | B2 | 4/2007 | Muylem et al. |
| 7,405,254 | B2 | 7/2008 | Muylem et al. |
| 7,446,153 | B2 | 11/2008 | Kolich et al. |
| 7,585,443 | B2 | 9/2009 | Luther |
| 7,632,893 | B2 | 12/2009 | Kolich et al. |
| 7,638,583 | B2 | 12/2009 | Kolich et al. |
| 7,666,943 | B2 | 2/2010 | Reed et al. |
| 7,666,944 | B2 | 2/2010 | De Schryver et al. |
| 2005/0159552 | A1 | 7/2005 | Reed et al. |
| 2008/0164445 | A1 | 7/2008 | Lin et al. |
| 2008/0167427 | A1 | 7/2008 | Lin et al. |
| 2009/0233097 | A1 | 9/2009 | Kolich et al. |
| 2009/0264599 | A1 | 10/2009 | Balhoff et al. |
| 2009/0299012 | A1 | 12/2009 | Luther |
| 2010/0047577 | A1 | 2/2010 | Luther et al. |

FOREIGN PATENT DOCUMENTS

| EP | 0002514 B2 | 8/1985 |
|---|---|---|
| EP | 0201411 A2 | 11/1986 |

(Continued)

OTHER PUBLICATIONS

Gill, J.C., "Brominated Polystyrene Flame Retardants: A Step Forward", Plastics Compounding, Sep./Oct. 1989, pp. 77, 78, 80, and 81.

*Primary Examiner* — Vasu Jagannathan
*Assistant Examiner* — Robert C Boyle
(74) *Attorney, Agent, or Firm* — Jeremy J. Kliebert

(57) ABSTRACT

Concurrently fed into a reaction zone held at about 10° C. or less are brominating agent, aluminum halide catalyst, and a solution of anionic styrenic polymer having a GPC Mn about 2000-30,000. The components are in at least two separate feed streams. The feeds are proportioned to maintain (a) the amount of aluminum halide being fed at about 0.8 mole percent or less based on the amount of aromatic monomeric units in the polymer being fed, and (b) amounts of brominating agent and unbrominated polymer in the reaction zone that produce a final washed and dried polymer product containing about 60-71 wt % bromine. The catalyst is deactivated, bromide ions and catalyst residues are washed away from the reaction mixture, and the brominated anionic styrenic polymer is recovered and dried. The dried polymer has a volatile bromobenzene content of about 600 ppm (wt/wt) or less as well as other beneficial properties.

16 Claims, 3 Drawing Sheets

FOREIGN PATENT DOCUMENTS

| | | |
|---|---|---|
| JP | 02-215807 A1 | 8/1990 |
| JP | 2000-281800 A1 | 10/2000 |
| WO | 97/47663 A1 | 12/1997 |
| WO | 98/13395 A1 | 4/1998 |
| WO | 98/13396 A1 | 4/1998 |
| WO | 98/13397 A1 | 4/1998 |
| WO | 98/50439 A1 | 11/1998 |
| WO | 99/25746 A1 | 5/1999 |
| WO | 99/55770 A1 | 11/1999 |
| WO | 00/14125 A1 | 3/2000 |
| WO | 00/14158 A1 | 3/2000 |
| WO | 02/072645 A2 | 9/2002 |
| WO | 2005/063869 A1 | 7/2005 |
| WO | 2005/068513 A1 | 7/2005 |
| WO | 2005/095685 A1 | 10/2005 |
| WO | 2005/118245 A1 | 12/2005 |
| WO | 2006/019414 A1 | 2/2006 |
| WO | 2007/005233 A1 | 1/2007 |
| WO | 2007/076355 A1 | 7/2007 |
| WO | 2007/076369 A1 | 7/2007 |
| WO | 2008/011477 A2 | 1/2008 |
| WO | 2008/024824 A1 | 2/2008 |
| WO | 2008/066970 A2 | 6/2008 |
| WO | 2008/086359 A1 | 7/2008 |
| WO | 2008/086362 A1 | 7/2008 |
| WO | 2009/058966 A1 | 5/2009 |

\* cited by examiner

BROMINATED ANIONIC STYRENIC POLYMERS AND THEIR PREPARATION

REFERENCE TO RELATED APPLICATIONS

This application is a division of U.S. application Ser. No. 11/612,991, filed Dec. 19, 2006, now U.S. Pat. No. 7,638,583, issued Dec. 29, 2009, which in turn claims the benefit and priority of U.S. Provisional Application No. 60/753,285, filed Dec. 21, 2005, the disclosures of which are incorporated herein by reference.

TECHNICAL FIELD

This invention relates to processes for the preparation of brominated anionic styrenic polymers having reduced contents of bromobenzenes, and to the novel brominated anionic styrenic polymers that can be produced by such processes.

BACKGROUND

Commonly-owned U.S. Pat. Nos. 5,677,390, 5,686,538, 5,767,203, 5,852,131, 5,852,132, 5,916,978, 6,133,381, 6,207,765, 6,232,393, 6,232,408, 6,235,831, 6,235,844, 6,326,439, and 6,521,714 describe what is believed to be the best known prior process technology for producing brominated styrenic polymers such as brominated polystyrene having the best known properties of any previously-known brominated styrenic polymer. In this connection, the terms "brominated styrenic polymer" and "brominated polystyrene" as used anywhere herein including the claims refer to a brominated polymer produced by bromination of a pre-existing styrenic polymer such as polystyrene or a copolymer of styrene and at least one other vinyl aromatic monomer, as distinguished from an oligomer or polymer produced by oligomerization or polymerization of one or more brominated styrenic monomers, the properties of the latter oligomers or polymers typically being considerably different from brominated polystyrene in a number of respects.

In producing brominated anionic styrenic polymers by bromination of anionic styrenic polymers, bromobenzene impurities tend to be formed in greater than desired quantities. Among these impurities are species in which benzene rings can be substituted by 2 to 6 bromine atoms. Because of their greater volatility at elevated temperatures encountered in molding, the species containing 2, 3, or 4 bromine atoms as ring substituents are more undesirable than those containing 5 or 6 bromine atoms on the ring. In the case of bromination of anionic polystyrene using aluminum halide catalysts in which the halide atoms are bromine or chlorine or both, the species containing 2, 3, or 4 bromine atoms as ring substituents as determined by NMR are, respectively, 1,4-dibromobenzene, 1,2,4-tribromobenzene, and 1,2,4,5-tetrabromobenzene. These volatile species have a strong odor and are considered to be skin and lung irritants. Also, the formation of these species in the process results from cleavage of aromatic rings from the polymer chain. This in turn introduces irregularities in the polymer chain and/or addition of bromine atoms to the polymer chain. Such addition results in reducing the thermal stability of the brominated styrenic polymer. Thus, it would be highly advantageous if a way could be found for reducing the formation of bromobenzene impurities, especially the more volatile dibromo, tribromo and/or tetrabromo species, during the actual preparation of brominated anionic styrenic polymers rather than relying upon purification steps during product workup or purification.

BRIEF SUMMARY OF THE INVENTION

This invention provides process technology which can significantly reduce the amounts of more volatile bromobenzenes present in finished brominated anionic styrenic polymer products without need for special product workup or special purification procedures. The reduction in the amounts of such bromobenzenes in the finished products does not rely upon use of special workup or special purification procedures to achieve such reductions. Instead, conventional workup and drying procedures can be used and yet the product will contain low amounts of volatile undesirable bromobenzenes, i.e., no more than 600 ppm (wt/wt) and in preferred cases, 300 ppm (wt/wt) or less.

More particularly, in accordance with this invention there is provided a process of preparing brominated anionic styrenic polymer having a reduced volatile bromobenzene content, which process comprises:

A) concurrently feeding into a reaction zone components comprised of (i) a brominating agent (preferably bromine), (ii) aluminum halide catalyst in which the halide atoms are bromine or chlorine or both, and (iii) anionic styrenic polymer (preferably anionic polystyrene) having a GPC number average molecular weight in the range of about 2000 to about 30,000 (preferably in the range of about 2000 to about 10,000 and more preferably in the range of about 3000 to about 7000) in the form of a solution or slurry in a solvent to form a reaction mixture, wherein said components are fed (1) individually as at least three separate feeds or (2) as at least two separate feeds, one feed of which contains no more than two of (i), (ii), and (iii), and another feed of which contains the third of (i), (ii), (iii) either individually or in combination with no more than one other of (i), (ii), and (iii), to thereby form a reaction mixture containing a liquid phase, and maintaining said reaction mixture at about 10° C. or less whereby bromination of anionic styrenic polymer occurs, the components being proportioned such that the amount of aluminum halide being fed is at about 0.8 mole percent or less in relation to the molar amount of aromatic monomer units in the anionic styrenic polymer being fed, and such that the dried brominated anionic styrenic polymer referred to in C) hereinafter will have a bromine content in the range of about 60 to about 71 wt % (and preferably in the range of about 67 to about 69 wt %);

B) deactivating the catalyst in, and washing away bromide ions and catalyst residues from
  1) substantially the entire reaction mixture or
  2) portions of the reaction mixture that have exited from the reaction zone;
  and C) recovering brominated anionic styrenic polymer product from the reaction mixture and drying such product whereby the dried brominated anionic styrenic polymer has a bromine content in the range of about 60 to about 71 wt % (preferably in the range of about 67 to about 69 wt %) and a volatile bromobenzene content which is no more than about 600 ppm (wt/wt), and preferably is about 300 ppm (wt/wt) or less.

Preferably in B), the catalyst is deactivated by quenching the reaction mixture in an aqueous quenching medium.

If the concurrent feeds of A) above unify (i), (ii) and (iii), for example in a feeding device such as an injector, probe, or nozzle feeding to or into a reaction mixture in a reactor, such unified contents within such feeding device constitute a portion of the reaction zone. When, in a case of this type, such concurrent feeds are continuous concurrent feeds, better temperature control is achieved by ensuring that the unified contents are caused to exit from such feeding device and enter the main body of the reaction mixture in the reactor within no more than about 5 seconds and preferably no more than about 2 seconds after unification in the device. And when, in a case of this type, at least one of such concurrent feeds is a rapidly pulsed concurrent feed, better temperature control and greater reaction mixture uniformity are achieved by ensuring that the unified contents are caused to exit from such feeding device and enter the main body of the reaction mixture in the reactor within no more than about 5 seconds and preferably no more than about 2 seconds after unification in the device.

It can be seen therefore that in conducting A) above components (i), (ii), and (iii) are in at least two separate feed streams and one of them, preferably (iii), is kept separate from at least one of (i) and (ii), preferably from both of (i) and (ii), until the at least two separate feeds of (i), (ii) and (iii):
1) directly enter the main body of the reaction mixture in the reactor such as a stirred tank reactor or a tubular or loop-type reactor, and/or
2) are unified no more than 5 seconds (and preferably no more than 2 seconds) before directly entering the reaction mixture in the main body of the reaction mixture in such a reactor.

In a preferred mode of operation, the above process is carried out in a closed reaction system whereby the hydrogen bromide coproduct is kept in the reaction mixture until the catalyst is deactivated, preferably in an aqueous quenching system. Because HBr coproduct is soluble in the halogenated solvent used, the HBr coproduct is thus carried through the closed reaction zone while in solution, and in fact serves as an additional diluent thereby reducing the viscosity of the polymeric solution. During bromination, the closed bromination system remains under autogenous pressure which is typically up to about 60 psig. This preferred mode of operation provides several tangible advantages. In the first place, the typical need for a scrubbing system for recovery of HBr coproduct from the exit gas stream from the bromination reactor is eliminated. Instead of providing and using such a scrubbing system, the bromine values of the HBr coproduct can all be recovered in a single operation from the contents of an aqueous quenching system used for deactivating the catalyst. Moreover, the capital cost for a scrubbing system and the costs involved in the maintenance of a scrubbing system are eliminated. In addition, the viscosity of the reaction mixture in which the HBr is retained is reduced as compared to a similar reaction system in which HBr has been removed. Such a reduction in viscosity offers the opportunity of operating with less solvent or enable use of a moderately higher molecular weight of an anionic styrenic polymer with the same level of solvent.

Pursuant to the practice of this invention there are also provided new brominated anionic styrenic polymer compositions having bromine contents in the range of about 60 to about 71 wt % (preferably in the range of about 67 to about 69 wt %), bromobenzene contents which are no more than about 600 ppm (wt/wt) and preferably 300 ppm or less, and additional desirable properties or characteristics, especially a thermal ΔE color value of about 15 or less and/or a thermal stability in the 320° C. Thermal Stability Test of about 125 ppm or less of HBr.

The above and other features and embodiments of this invention will be still further apparent from the ensuing description and appended claims.

FURTHER DETAILED DESCRIPTION OF THE INVENTION

Figure 1:
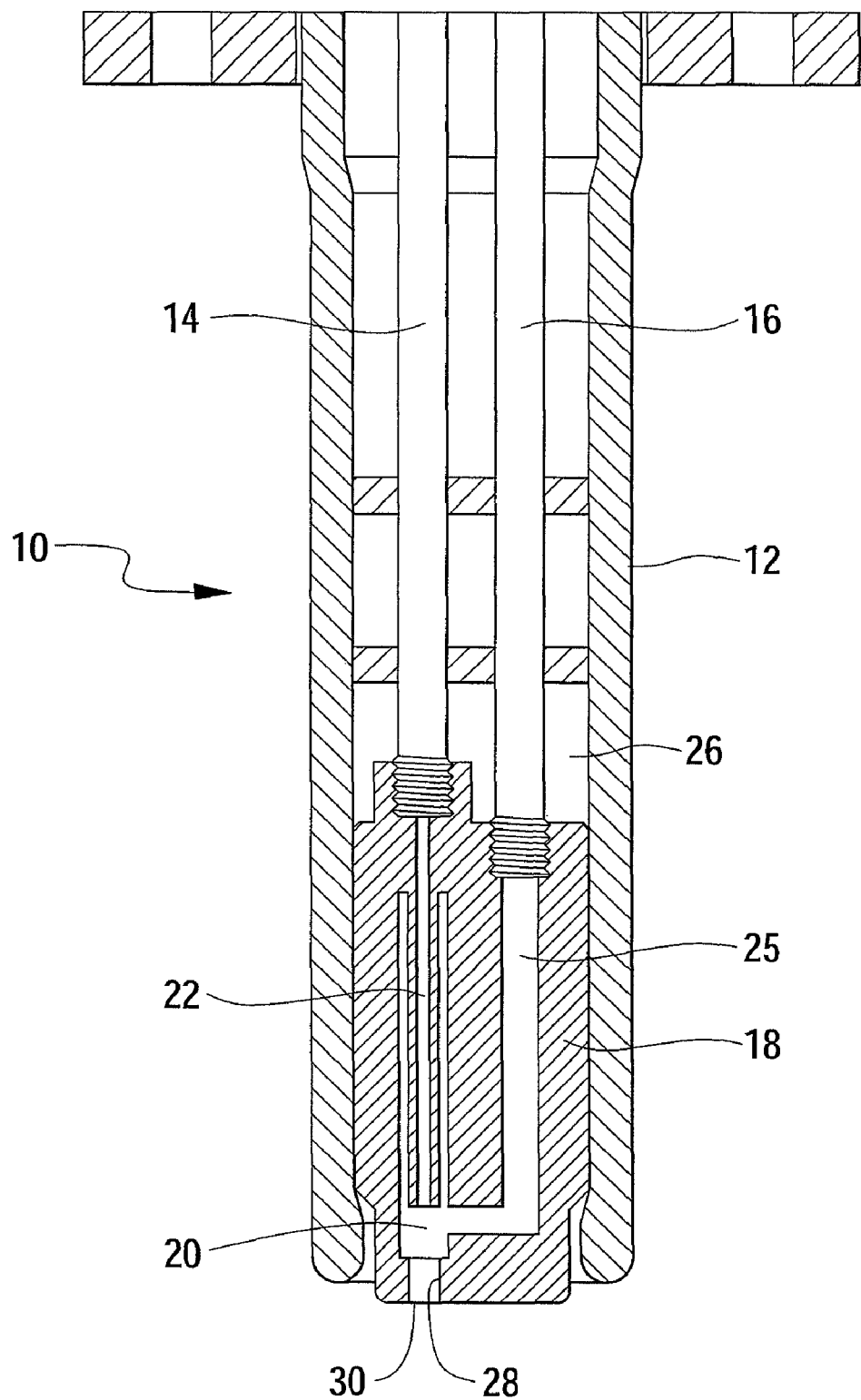
FIG. 1 is a schematic elevational depiction of an injection system for feeding reactants, solvent, and catalyst into a reaction zone in the practice of this invention.

As used anywhere herein including the claims, the term "bromobenzene", whether in the singular or plural, refers to one or more brominated aromatic hydrocarbons formed as one or more coproducts or impurities in the bromination reaction itself. The benzene ring may contain one or more substituents other than one or more bromine atoms. For example it is likely that if an anionic styrenic polymer formed in whole or in part from a methylstyrene is subjected to bromination in the process, at least some of the "bromobenzene" coproduct formed will be bromobenzenes having methyl and/or bromomethyl substituents on the ring. Thus "bromobenzene" or "bromobenzenes" as used anywhere herein including the claims in connection with impurity formation or impurity content is not to be taken literally—instead these terms are used to represent the brominated aromatic impurities that form during the bromination of the anionic styrenic polymer selected for use in the process. The term "volatile bromobenzene", whether in the singular or plural, denotes bromobenzene species having in the range of 1 to 4 bromine atoms directly attached to the benzene ring of the bromobenzene, which, in the case of bromobenzenes formed when producing brominated anionic polystyrene, are comprised of one or more of dibromo, tribromo, and/or tetrabromo species, typically 1,4-dibromobenzene, 1,2,4-tribromobenzene, and/or 1,2,4,5-tetrabromobenzene.

Similarly as used anywhere herein including the claims, the terms "anionic styrenic polymer" and "anionic polystyrene" are terms commonly used by those of ordinary skill in the art to denote, respectively, a styrenic polymer or polystyrene made by use of an anionic polymerization initiator, such as, for example, a lithium alkyl. Thus, as is well known to those of ordinary skill in the art, these terms do not mean that the polymer itself is anionic.

In the embodiments of this invention wherein a closed reaction system is used, the term "closed reaction system" denotes a reaction system which, except for piping or conduits carrying the necessary components (including purging carrier gases, etc.) into and out of the bromination reaction zone and into and out of the catalyst deactivation zone, is closed from its surroundings. In short, the system is designed such that gaseous HBr coproduct does not escape from the system, but rather is caused to travel from the bromination reaction zone into the catalyst deactivation zone for recovery in a suitable form.

Bromination Process Technology

The processes of this invention can be conducted as a batch or semi-batch process, or as a continuous process. Among the features of the process are:
1) concurrently feeding into a reaction zone, (i) a brominating agent (preferably bromine), (ii) aluminum halide catalyst in which the halide atoms are bromine or chlorine or both, and (iii) anionic styrenic polymer (preferably anionic polystyrene) having a GPC $M_n$ in the range of about 2000 to about 30,000 (preferably in the range of about 2000 to about 10,000, and more preferably in the range of about 3000 to about 7000) in the form of a solution or slurry (preferably as a solution) in a solvent;

2) conducting the feeding of (i), (ii), and (iii) in at least two separate feed streams and wherein no such feed stream is formed from all three of (i), (ii), and (iii) except where the feeds are unified, e.g., within a feeding probe, injector or nozzle no more than 5 seconds and preferably no more than 2 seconds before leaving the feeding probe, injector or nozzle and entering (preferably directly entering) the main body of the reaction mixture in a larger reactor, and preferably feeding (i), (ii), and (iii) as separate feeds or combining (i) and (ii) as a single feed which is fed separately from (iii);

3) maintaining the reaction zone at about 10° C. or less, preferably about 5° C. or less, more preferably in the range of about −2° C. to about 3° C., to provide a reaction mixture containing a liquid phase;

4) proportioning the feed components to maintain the amount of aluminum halide as it is being fed into the reaction mixture at about 0.8 mole percent or less based on the molar amount of monomer units in the anionic styrenic polymer as it is being fed into the reaction mixture;

5) proportioning the feed components to maintain amounts of brominating agent and anionic styrenic polymer fed in the reaction zone so that the final washed and dried brominated anionic styrenic polymer product formed contains in the range of about 60 to about 71 wt % of bromine, and preferably in the range of about 67 to about 69 wt % of bromine;

6) deactivating the catalyst, typically by quenching (a) the entire reaction mixture in a batch process operation or (b) portions of the reaction mixture after removal from the reaction zone in a continuous process operation, with an aqueous quenching solution soon enough that the bromobenzene content of the washed and dried brominated anionic styrenic polymer is no more than about 600 ppm (wt/wt), and preferably is about 300 ppm (wt/wt) or less;

7) preferably conducting the bromination in a closed reaction system so that the coproduct HBr remains in the reaction mixture until the catalyst is deactivated, preferably by quenching the reaction mixture with and recovering the HBr coproduct in an aqueous quenching medium.

Feed (iii), i.e., the solution or slurry of the anionic styrenic polymer, should contain enough solvent to form a solution or slurry that is flowable or pumpable.

Another feature of this invention is that although it might be expected that the bromination reaction rate would be reduced by operating in a closed bromination reaction system so that the HBr coproduct remains with the reaction mixture throughout the bromination, it has been found that for all practical purposes the bromination reaction rate appears to be as fast as if the bromination was conducted at atmospheric pressure.

The molar amount of aluminum halide catalyst being fed to the reaction mixture and the molar amount of aromatic monomer units in the anionic styrenic polymer concurrently being fed to the reaction mixture can be maintained at or below the specified molar ratio limit, by use of appropriate amounts of (ii) and (iii) in the feeds and by setting and/or controlling the respective feeds rates at which (ii) and (iii) are delivered or charged into the reaction mixture in the reaction zone. In this connection, the ratio of the molar amount of aluminum halide catalyst being fed and the molar amount of aromatic monomer units in the anionic styrenic polymer concurrently being fed is determined by use of the following expression:

$$\text{Mole \% } AlX_3 = \frac{\dfrac{\text{Weight of } AlX_3}{\text{Formula Weight of } AlX_3}}{\dfrac{\text{Weight of Polymer}}{\text{Formula Weight of Monomeric Unit}}} \times 100$$

where the weights of aluminum halide catalyst (represented as $AlX_3$ in the expression) and of the polymer are in the same mass units such as grams or pounds.

Preferably the concurrent feeds in A) comprise one or more separate individual feeds of (i), (ii), and (iii) or one or more separate feeds of (1) a combination or mixture formed from (i) and (ii) and (2) one or more separate feeds of (iii). Desirably, the probes, injectors or nozzles for these streams are disposed such that the respective feed streams therefrom exit directly into the body of the liquid phase of the reaction mixture in the reaction zone. It is also preferred that the sites where each of the separate feed streams for a feed of (i), (ii), and (iii) in which one of them (with or without another one of them) is separate from the other two of them or a feed of all three of them fed separately and individually emerges from the probes, injectors or nozzles directly into the liquid phase of the reaction mixture are proximate to the emergent site or emergent sites of the other feed stream or streams. In more preferred embodiments, at least one of the separate feed streams is a combination of (i) and (ii) and at least another of such separate feed streams is (iii), and such feed streams are fed subsurface into the reaction mixture or within the body of the liquid phase of the reaction mixture by means of concentric or coaxially-aligned injection probes or nozzles, or by means of injection probes, injectors or nozzles in substantial face-to-face opposed alignment so that the feeds are directed towards each other from proximate orifices. By "substantial face-to-face opposed alignment" is meant that the respective axes of the streams emanating from the probes, injectors or nozzles confront each other in the same plane at a 180° displacement (i.e., they are directly opposed to each other on a common axis) or the axes of the streams confront each other in a common plane at an obtuse angular displacement (i.e., they are opposed to each other by more than 90° in a common plane).

As noted above, in preferred embodiments the sites in the liquid reaction mixture where the respective feed streams enter or are injected directly into the reaction mixture are proximate to each other. As used herein, including the claims, the term "proximate to" denotes that the sites where the feed streams directly enter the reaction mixture are close enough to each other that formation of unacceptable amounts of insoluble polymer due to cross-linking of the unbrominated or partially brominated anionic styrenic polymer does not occur. Such cross-linking can occur if the feed streams enter a reaction mixture at too great a distance from each other unless there is sufficient rapid agitation of the reaction mixture at very low temperatures (e.g., 0° C. or below) to prevent excessive cross-linked polymer formation from occurring.

Without being bound by theory, it does not appear unreasonable to suggest that in the reaction mixture into which the concurrent feeds take place, three competing reactions can occur, viz., (a) the desired bromination of the anionic styrenic polymer and (b) undesired alkylation of the anionic styrenic polymer by the chloro- and/or bromohydrocarbon solvent being used (which can also lead to crosslinking of unbrominated or partially brominated anionic styrenic polymer), and (c) the undesirable dealkylation of the polymers aromatic rings producing bromobenzene impurities and creating sites of thermal instability on the polymer chain, all such reactions being catalyzed by the aluminum halide catalyst being used. By cofeeding the reactants and catalyst in proportions and at the low reaction temperatures as described herein, and preferably so that the feeds rapidly come into intimate contact with each other because of the proximate injector or probe feeding sites employed, the bromination reaction occurs much more rapidly than any competing alkylation or dealkylation reaction and once the desired high level of bromination has occurred the resultant brominated anionic styrenic polymer product is more resistant to alkylation or dealkylation than unbrominated or partially brominated anionic styrenic polymers.

When utilizing a preferred proximate feeding system, the maximum distance between or among the entry sites of feed streams will depend on various factors such as the rate of agitation of the reaction mixture, the temperature of the reaction mixture, the velocities of the respective feed streams, the concentrations of the respective feed streams, and the extent of solubility of the catalyst in the reaction mixture and/or the solubility, if any, of the catalyst in the feed stream. As a rule of thumb, in designing a feed system for a commercial-sized installation, it is desirable to keep the distance between or among the emergent sites of the feed streams from their respective injectors or probes in a commercial installation at no more than about 4 inches unless exceptionally high rates of agitation and very low reaction temperatures are used. The smaller the distance below about 4 inches, the better. Preferably, coaxial feeding or substantial face-to-face opposed alignment feeding of the feed streams is employed. Coaxial feeding results, for example, from use of concentric injectors or probes extending subsurface into the liquid phase of the reaction mixture.

In continuous operation of the process, average reaction time or average residence time (i.e., the average time the reactants and catalysts are in contact with each other or, in other words, the time from initial contact of the reactants and catalyst until deactivation of catalyst) will typically be up to about 30 minutes and preferably about 20 minutes or less. More preferred continuous processes of this invention involve average reaction times or average residence times in the range of about 2 to about 10 minutes, more preferably in the range of about 2 to about 5 minutes, and still more preferably in the range of up to about 2 or 3 minutes. Such short residence times are made possible by the use of the aluminum halide catalyst and the unique feeding methods employed used in the processes of this invention. In the case of batch type operations, quantification of reaction time is more difficult as reaction times can be greatly affected by such factors as the scale of operation, the extent of agitation provided within the reactor, and the rate of heat transfer in the reaction system. Thus in keeping the reaction time short enough to prevent formation of brominated anionic styrenic polymer containing more than about 600 ppm (wt/wt) of bromobenzene impurities, recourse may be had to use of trial experiments. As rules of thumb, which should be of assistance in this regard, when operating at a 2000 gallon scale, a period of up to 3 hours may be permissible whereas at a 4000 gallon scale of operation, a period of up to 6 hours may be permissible. While there is some scale-up effect in continuous operation, the effect in such operation tends to be of lesser magnitude than in the case of batch operation.

As noted above, the concurrent feeding of (i) a brominating agent, preferably bromine, (ii) aluminum halide catalyst in which the halide atoms are bromine or chlorine or both, and (iii) the anionic styrenic polymer solution in a solvent is conducted such that (i), (ii), and (iii) are in at least two separate feed streams and wherein no such feed stream is formed from all three of (i), (ii), and (iii). Thus, there are four basic ways of carrying out such feeding. These are:

1) feed (i), (ii), and (iii) as three separate feeds;
2) feed a combination of (i) and (ii) as a single feed which is fed separately from (iii);
3) feed a combination of (ii) and (iii) as a single feed which is fed separately from (i); and
4) feed a combination of (i) and (iii) as a single feed which is fed separately from (ii).

Combinations of two or more feeds of 1), 2), 3), and 4) are possible. Also, any or all of the foregoing feeds can be introduced at more than one location in the reaction zone. As non-limiting examples, in the case of 1) there can be multiple separate feeds of any of (i), (ii), and/or (iii). Similarly, in 2) there can be multiple separate feeds of the combination of (i) and (ii) and/or multiple separate feeds of (iii), and so on. Where two or more feeds of (i), (ii), and (iii) are employed, it is desirable to have the respective sets of feeds disposed such that their own feeds enter the reaction mixture proximate to each other, even though the respective sets of feeds are spaced-apart from each other. For example, where at a first locus of a continuous stirred tank reactor a feed of a mixture of (i) and (ii) and a separate feed of (iii) exist, and at a second spaced apart locus of the same continuous stirred tank reactor, a feed of a mixture of (i) and (ii) and a separate feed of (iii) exist, the two feeds at the first locus preferably are proximate to each other, and the two feeds at the second locus preferably are proximate to each other. However, there is no need to have all four of such feeds proximate to each other.

Feeding as in 1) or 2) above is preferred, and feeding as in 2) above is more preferred.

In the case of feeding as in 3) above, it is desirable to use a chlorine-free organic solvent such as dibromomethane or 1,2-dibromoethane to avoid degradation of the catalyst. If a chlorine-containing solvent such as bromochloromethane is used, the mixture of the catalyst and the anionic styrenic polymer solution should be formed just before feeding into the reactor to avoid any catalyst degradation which tends to occur over time.

In the case of feeding as in 4) above, the combination of brominating agent, especially bromine, and anionic styrenic polymer solution should not be preformed and stored for any substantial period of time as the brominating agent such as bromine will tend to brominate the polymer chain during storage. Thus, as a general rule, if feeding as in 4) is to be used it is desirable to form the mixture of brominating agent and polymer solution and feed the resultant mixture into the reaction zone within a few minutes after formation, with the shorter the period from mixture formation to feeding, the better.

Irrespective of the manner in which (i), (ii), and (iii) are fed in accordance with the above, the concurrent feeding of (i) a brominating agent, preferably bromine, (ii) aluminum halide catalyst in which the halide atoms are bromine or chlorine or both, and (iii) the anionic styrenic polymer solution in a solvent does not require that the feeds, be initiated at the same moment of time. For example, if, say, a continuous feed of (iii) is initiated followed 1 minute later by initiation of a continuous feed of (ii), followed 1 minute later by initiation of a continuous feed of (i), the bromination time starts with the initiation of the feed of (i) because in the prior two minutes bromination pursuant to the invention would not occur. Also slight interruptions of one or more feeds during continuous feeding of (i), (ii), and (iii) that do not disrupt the overall operation of the process or have an adverse effect upon product composition are acceptable. Naturally, such interruptions should be avoided as much as possible, especially once steady state operation has been achieved.

In each of the process embodiments of this invention the concurrent feeds of (i), (ii), and (iii) whether separate or with (1) a combination of any two of (i), (ii), and (iii) as one feed and (2) the third as a separate feed—which may be in combination with one of the two of (i), (ii), and (iii) present in the combination of (1)—there are different ways in which the actual feeds themselves are fed into the reaction zone to form a reaction mixture. One way is to have each feed in the form of a continuous feed stream. A second way is to have each feed in the form of a pulsed feed stream in which time intervals between the pulses are sufficiently short to keep the amount of aluminum halide being fed at about 0.8 mole percent or less in relation to the molar amount of aromatic monomer units in the anionic styrenic polymer being fed, and to keep the amounts of brominating agent and anionic styrenic polymer being fed proportioned to produce a final washed and dried brominated anionic styrenic polymer product containing in the range of about 60 to about 71 weight percent bromine. In this second way of feeding the respective feeds, the pulses as between or among the respective feeds themselves can either be synchronized to be simultaneous concurrent pulses or to be alternating pulses, or the respective pulses can be unsynchronized relative to each other, and in each instance the pulses can be regular or irregular, all with the proviso that the amount of aluminum halide being fed is kept at about 0.8 mole percent or less in relation to the molar amount of aromatic monomer units in the anionic styrenic polymer being fed, and the amounts of brominating agent and anionic styrenic polymer being fed are kept in proportions to produce a final washed and dried brominated anionic styrenic polymer product containing in the range of about 60 to about 71 weight percent bromine. A third way is to have at least one of the respective feeds as a continuous feed stream and at least one other of the respective feeds as a regular or irregular pulsed stream with appropriate time intervals between pulses, again subject to the proviso just given in connection with the second way of feeding the respective feeds.

If necessary, the feed streams to the bromination reaction zone can be degassed to remove dissolved atmospheric gases that may be entrained therein. In this way, the possibility of exceeding the pressure limitations of the bromination reaction system being employed is minimized.

In conducting the bromination process, it can be helpful to initially provide in the reaction zone a quantity of solvent such as the solvent used in forming the solution with the anionic styrenic polymer. In this way, a more dilute and thus less viscous reaction mixture can be maintained in the reaction zone. If desired, a continuous or periodic separate feed of such additional solvent to the reaction zone can be employed. Excessive viscosity in the reaction zone is undesirable as it tends to interfere with continuous intimate contact among the reaction components.

Components (i) and (iii) can be proportioned to produce a final washed and dried brominated anionic styrenic polymers of this invention containing in the range of about 60 to about 71 wt % and preferably in the range of about 67 to about 69 wt % of bromine. The manner of proportioning the anionic styrenic polymer and the brominating agent to achieve various desired bromine contents are known to those of ordinary skill in this art and have been described in the commonly-owned patents referred to at the outset of this document.

There are various ways in which the processes of this invention can be carried out. One method, which may be termed a batch or a semi-batch mode of operation involves rapidly introducing as described above, components (i), (ii), and (iii) into a reactor such as a stirred pot reactor so that the maximum time that any portion of the components are undergoing a bromination reaction does not result in formation of product containing more than about 600 ppm (wt/wt) of bromobenzene impurities. To terminate the reaction, the mixture in the stirred pot reactor can be rapidly quenched either by introduction of a quenching composition into the reactor or by dumping or feeding the contents of the reactor into a quenching vessel containing the quenching composition. In this way, no portion of the reaction mixture undergoes further bromination. So that the last portion of components fed to the reactor have sufficient time to undergo suitable bromination, it is desirable to stop the feeds and to allow a period of at least 1-2 minutes before deactivating the catalyst. This at least 1-2 minute period serves as a residual period for the last portion of the components to undergo bromination. This batch or semi-batch mode of operation should involve rapid introduction of the components into the reactor and also sufficiently rapid agitation and efficient cooling of the reactor contents so that the reaction temperature is maintained within the above-specified temperature ranges and within a suitable bromination reaction time.

Another mode of operation involves use of a continuous process. In one such embodiment of this invention, there is provided a process of preparing brominated anionic styrenic polymer having a reduced volatile bromobenzene content, which process comprises:

A) causing reaction mixture having a liquid phase, which reaction mixture is continuously formed from concurrent feeds of components comprised of (i) a brominating agent (preferably bromine), (ii) aluminum halide catalyst in which the halide atoms are bromine or chlorine atoms and (iii) anionic styrenic polymer having a GPC $M_n$ in the range of about 2000 to about 30,000 (preferably in the range of about 2000 to about 10,000, and more preferably in the range of about 3000 to about 7000) in the form of a solution in a solvent, to continuously travel through and exit from said reaction zone maintained at one or more temperatures in the range of about 10° C. or less, so that bromination of anionic styrenic polymer occurs during at least a portion of such travel, the components being fed being proportioned such that the amount of aluminum halide being fed is at about 0.8 mole percent or less in relation to the molar amount of aromatic monomer units in the anionic styrenic polymer being fed, and such that the dried brominated anionic styrenic polymer referred to in C) hereinafter will have a bromine content in the range of about 60 to about 71 wt % and preferably in the range of about 67 to about 69 wt %;

B) deactivating the catalyst in, and washing away bromide ions and catalyst residues from reaction mixture that has exited from the reaction zone (and preferably continuously deactivating catalyst in the reaction mixture promptly after it exits from the reaction zone and washing away bromide ions and catalyst residues from reaction mixture that has exited from the reaction zone);

C) recovering brominated anionic styrenic polymer product from the reaction mixture and drying such product whereby the dried brominated anionic styrenic polymer has a bromine content in the range of about 60 to about 71 wt % and preferably in the range of about 67 to about 69 wt % and a volatile bromobenzene content which is no more than about 600 ppm (wt/wt) and preferably about 300 ppm (wt/wt) or less.

Preferably the concurrent feeds in such a continuous process are conducted either by separately and individually feeding each of (i), (ii), and (iii) concurrently into the reaction mixture, or by separately feeding (a) a preformed mixture of components (i) and (ii) and (b) component (iii) concurrently into the reaction mixture.

Another continuous process embodiment of this invention is a process of preparing brominated anionic styrenic polymer having a reduced volatile bromobenzene content, which process comprises:

A) causing reaction mixture having a liquid phase, which reaction mixture is continuously formed from concurrent feeds of components comprised of (i) a brominating agent (preferably bromine), (ii) aluminum halide catalyst in which the halide atoms are bromine or chlorine atoms and (iii) anionic styrenic polymer having a GPC $M_n$ in the range of about 2000 to about 30,000 (preferably in the range of about 2000 to about 10,000, and more preferably in the range of about 3000 to about 7000) in the form of a solution or slurry in a solvent (preferably a solution in a solvent), to continuously travel through and exit from said reaction zone maintained at one or more temperatures in the range of about 10° C. or less, so that bromination of anionic styrenic polymer occurs during at least a portion of such travel, said feeds of (i), (ii), and (iii) being in at least two separate feed streams and with (ii) being kept separate from at least one of (i) and (iii) until the at least two separate feeds of (i), (ii) and (iii) directly enter the reaction mixture and/or are unified (e.g. within a feeding device such as a probe, injector or nozzle which is injecting the unified feeds into the reaction mixture) no more than 5 seconds and preferably no more than 2 seconds before emerging from the feeding device and entering the larger body of the reaction mixture in the reactor, the components being combined are proportioned such that the amount of aluminum halide being fed is at about 0.8 mole percent or less in relation to the molar amount of aromatic monomer units in the anionic styrenic polymer being fed, and such that the dried brominated anionic styrenic polymer referred to in C) hereinafter will have a bromine content in the range of about 60 to about 71 wt % and preferably in the range of about 67 to about 69 wt %;

B) deactivating the catalyst in, and washing away bromide ions and catalyst residues from reaction mixture that has exited from the reaction zone (and preferably continuously deactivating catalyst in the reaction mixture promptly after it exits from the reaction zone and washing away bromide ions and catalyst residues from reaction mixture that has exited from the reaction zone); and C) recovering brominated anionic styrenic polymer product from the reaction mixture and drying such product whereby the dried brominated anionic styrenic polymer has a bromine content in the range of about 60 to about 71 wt % (preferably in the range of about 67 to about 69 wt %) and a volatile bromobenzene content which is no more than about 600 ppm (wt/wt) (preferably about 300 ppm (wt/wt) or less).

In conducting this continuous process, preferably the reaction mixture as continuously formed in A) is comprised predominately or entirely of a liquid mixture, preferably the brominating agent is bromine, and preferably the bromine is continuously fed within the confines of the liquid reaction mixture being continuously formed. The term "confines" means within the body of the liquid reaction mixture as distinguished from feeding onto an exterior portion of the liquid reaction mixture. Feeding into the confines can be accomplished by use of an injector, nozzle or feeding probe which extends into the body of the liquid reaction mixture in the reactor. In a batch/semi-batch operation in a stirred pot type of reaction vessel it is desirable to provide that the emerging feed from each injector, nozzle, or feeding probe is in close proximity to the periphery of the stirring blades so that the reactants are quickly dispersed within the body of the liquid reaction mixture being formed in the reaction zone and any temperature gradients are minimized.

In the continuous mode of operation the reaction mixture formed in A) from components (i), (ii), and (iii) can be formed in various ways. For example, the bromination reaction mixture can be formed by use of at least two separate continuous feeds of (i), (ii), and (iii) with no such feed being formed from all three of (i), (ii), and (iii), all as described above. Also, there can be plural feed inlets to the reaction zone for one or more of (i), (ii), and (iii). Regardless of how many feed inlets are used and how the feeds are carried out, the feeds should be substantially concurrent (except at start up when the feeds can be started at different times). Slight feed interruptions which cause no substantial imbalance in the operation can be tolerated but if possible, should be avoided or at least minimized so that steady state operation may be achieved. While it is preferred that all such feeds be continuous feeds, it is deemed possible to operate with one or more pulsed feeds having uniformly short time intervals between individual pulses. In each of the foregoing ways of carrying out the feeds in A), a separate concurrent continuous or discontinuous feed of solvent can be utilized as another feed stream in A), if desired. As in the case of the batch/semi-batch mode of operation, it is desirable to have the individual bromine feed(s) or the feed mixture(s)/solution(s) containing bromine to be fed directly into the confines of the liquid reaction mixture being formed in the reaction zone so that the bromine is rapidly dispersed within such liquid reaction mixture as it is being formed. Thus the reaction zone may be provided with a turbulent flow zone into which the individual bromine feed(s) or the feed mixture(s)/solution(s) containing bromine is/are injected into the body of a turbulent reaction mixture as it is being formed in the reaction zone.

In conducting a continuous process of this invention, it is desirable to provide, maintain, and/or control the rate at which the reaction mixture exits from the reaction zone in A) in relation to the rate of the feeding of components (i), (ii), and (iii) into the reaction zone such that the volume of the traveling contents of the reaction zone remains substantially constant. Thus, it is usually preferable to have continuous feeds to the reaction zone and continuous flows from the reaction zone, as this tends to make it easier to maintain an essentially constant volume in the reaction zone. However, it is possible to use pulsed feeds to the reaction zone or one or more pulsed streams exiting from the reaction zone while at the same time keeping the volume of the reaction mixture in the reaction zone substantially constant.

The processes of this invention can be conducted at any suitable pressure. Preferably the process is conducted at a pressure up to about 60 psig and more preferably in a closed bromination reaction system under autogenous pressure.

Product Workup and Drying

In the practice of this invention the product workup involves deactivating the catalyst and washing away bromide ions and catalyst residues (preferably by quenching the reaction mixture with or in an aqueous quenching medium). If any residual bromine remains in the reaction mixture prior to deactivating the catalyst, the aqueous quenching medium should contain a reducing agent such as sodium sulfite to convert the bromine into bromide ions which are then washed away in the aqueous phase resulting from the quenching operation, recovering the brominated anionic styrenic polymer product, and drying the washed brominated anionic styrenic polymer product. Product recovery and washing can be carried out as a single unitary operation.

Deactivation of the catalyst in B) of a batch operation is typically carried out by quenching the entire reaction mixture with a quenching composition. Deactivation of the catalyst in B) of a continuous process is typically carried out by quenching reaction mixture that exits from the reaction zone with a quenching composition as or after such reaction mixture exits from the reaction zone. In either case, the quenching composition typically comprises water in the liquid state. In a continuous operation the quenching step can be carried out either discontinuously or continuously. Discontinuous quenching involves collecting during a short period of time reaction mixture as it exits from the reaction zone and then promptly quenching that quantity in or with the quenching composition. Continuous quenching involves causing the reaction mixture as it continuously exits from the reaction zone to be quenched in or with the quenching composition.

The makeup of the aqueous quenching composition can vary considerably. Typically however, the quenching composition will comprise at least water in the liquid state. An aqueous solution of one or more suitable salts can also be used as a quenching composition. Non-limiting examples of salts which may be used in forming quenching compositions include sodium sulfite, sodium bisulfite, and sodium borohydride. Temperatures for the quenching composition can also vary, but typically will be in the range of 0 to 30° C. The concentration of the quenching composition comprised of one or more suitable salts in water is also susceptible to variation. In actual practice, in situations where some residual bromine exists in the reaction mixture after removal from the bromination reaction zone, use of 1% to 10% solutions of sodium sulfite in water have been found convenient for use as quenching compositions to reduce the bromine to bromide ions which are then carried away in the aqueous phase. However, other concentrations can be used. Preferably, the quenching liquid is composed solely of water.

Product recovery and workup after quenching can be conducted by letting the quenched reaction mass settle to obtain a two-phase reaction mass containing an organic phase, which contains, as a solute, the brominated anionic styrenic polymer product and an aqueous phase. The aqueous phase is decanted and the remaining organic phase is stripped of its solvent component. It is most convenient to accomplish this strip by pumping the organic phase into boiling water. As the solvent is flashed off, the brominated anionic styrenic polymer product forms a precipitate. The precipitate can be recovered by any liquid-solid separation technique, e.g., filtration, centrifugation, etc. The recovered precipitated washed product is then dried, typically at a temperature in the range of about 110° C. to about 150° C.

If desired, the aqueous phase from the quenching operation containing HBr can be treated with a metallic base such as sodium hydroxide, potassium hydroxide, magnesium hydroxide, or calcium hydroxide to produce the corresponding metallic bromide salt. Preferably, the aqueous phase from the quenching operation can be steamed stripped in either a continuous or batch operation to remove traces of solvent and thereby provide an aqueous hydrobromic acid solution suitable for use or sale.

When properly conducted in the manner described above, the brominated anionic styrenic polymer produced by the process of this invention, will contain no more than about 600 ppm (wt/wt) and preferably about 300 ppm (wt/wt) or less of bromobenzene impurities.

Components Used as Feeds to the Reaction Zone

In both the batch/semi-batch mode of operation and the continuous mode of operation, various materials can be used as components (i), (ii), and (iii). For example, in all such modes of operation it is preferred to use elemental bromine as the brominating agent. The bromine should be of high purity. Methods for purifying bromine when and if necessary or desirable are described in many of the commonly-owned patents referred to at the outset of this document. However, other brominating agents can be used in the practice of this invention. Among known brominating agents that may be used are bromine chloride, N-bromosuccinimde, 1,3-dibromohydantoin, and pyridinium tribromide.

Anionic styrenic polymers which are brominated to form the brominated anionic styrenic polymers of this invention are homopolymers of styrene or copolymers of styrene with other vinyl aromatic monomers. Among suitable vinyl aromatic monomers from which the anionic styrenic polymers can be formed are those having the formula:

wherein R is a hydrogen atom or an alkyl group having from 1 to 4 carbon atoms and Ar is an aromatic group (including alkyl-ring substituted aromatic groups) of from 6 to 10 carbon atoms. Anionic polystyrene itself is a preferred styrenic polymer. Use can be made however of other anionic styrenic polymers such as those made from at least 50 weight percent, and more desirably at least 80 weight percent of styrene and/or alpha-methylstyrene with the balance being derived from ring substituted styrenic monomers. Thus, the "anionic styrenic polymers" used in the practice of this invention are formed by anionic initiated polymerization of one or more styrenic monomers in which at least 50%, preferably at least 80%, and more preferably essentially 100% of the aromatic groups in the polymer have a hydrogen atom on at least one ortho position, and when the ring system of such aromatic groups is composed of a combination of phenyl groups and alkyl-substituted phenyl groups, at least 50%, preferably at least 80%, and more preferably essentially 100% of all such phenyl groups have a hydrogen atom on each ortho position. Non-limiting examples of suitable monomers that may be used for producing styrenic polymers of this invention are styrene, alpha-methylstyrene, ortho-methylstyrene, meta-methylstyrene, para-methylstyrene, para-ethylstyrene, isopropenyltoluene, vinylnaphthalene, isopropenylnaphthalene, vinylbiphenyl, vinylanthracene, the dimethylstyrenes, and tert-butylstyrene. Those having an unfused benzene ring in the molecule (i.e., those that are devoid of fused ring structures) are preferred.

Thus, the styrenic polymers used in this invention are typically polymers made by anionic polymerization procedures. An excellent process for producing anionic polystyrene is described in commonly-owned U.S. Pat. No. 6,657,028.

Blends or mixtures of two or more anionic styrenic polymers can also be brominated using a bromination process of this invention. Such blends or mixtures can be composed of two or more different anionic styrenic polymers made by anionically-initiated polymerization. A blend or mixture composed predominately of at least one styrenic polymer made by anionically-initiated polymerization and a small amount of at least one styrenic polymer made by free radical-initiated polymerization may also be used as the polymer substrate to be brominated by a process of this invention, but use of such blends or mixtures is not preferred.

Any of a variety of suitable organic solvents can be used as the solvent for the styrenic polymer. Thus use can be made of such substances as, for example, dichloromethane, dibromomethane, bromochloromethane, bromotrichloromethane, chloroform, 1,2-dibromoethane, 1,1-dibromoethane, 1-bromo-2-chloroethane, 1,2-dichloroethane, 1,1,2-tribromoethane, 1,1,2,2-tetrabromoethane, 1,2-dibromopropane, 1-bromo-3-chloropropane, 1-bromobutane, 2-bromobutane, 2-bromo-2-methylpropane, 1-bromopentane, 1,5-dibromopentane, 1-bromo-2-methylbutane, 1-bromohexane, 1-bromoheptane, bromocyclohexane, and liquid isomers, homologs, or analogs thereof. Liquid mixtures of two or more such compounds can be used. Preferred solvents are dichloromethane, dibromomethane, and 1,2-dichloroethane. Bromochloromethane is a particularly preferred solvent.

With anionic styrenic polymers having a weight average molecular weight in the range of about 2000 to about 10,000, preferably the anionic styrenic polymer solution used will contain in the range of 250 to 700 grams of the styrenic polymer per kilogram of solvent. With anionic styrenic polymers of higher molecular weights the solutions should be more dilute to compensate for the increased viscosity of such polymer solutions.

Anionic styrenic polymer is predissolved in the solvent prior to use in forming the reaction mixture. The reaction zone in a batch or semi-batch operation should contain a suitable quantity of organic solvent prior to initiation of the feed of the components of the reaction mixture in order to provide good heat transfer and efficient mixing in the initial stage of the feeds. In a continuous mode of operation, a separate stream of additional solvent can be fed into the reaction zone, if desired.

The catalyst as used in forming the reaction mixture is at least one aluminum halide catalyst in which the halide atoms are bromine or chlorine atoms. One such catalyst which is very useful in forming the reaction mixture is aluminum tribromide because of its good solubility in bromine and halohydrocarbon solvents, such as dibromomethane and bromochloromethane. Aluminum halides containing both bromine atom(s) and chlorine atom(s) that may be used in forming the reaction mixture include such substances as aluminum bromide dichloride ($AlBrCl_2$, Reg. No. 60284-44-8), aluminum dibromide chloride ($AlBr_2Cl$, Reg. No. 60284-43-7), aluminum bromide chloride ($Al_2Br_5Cl$, Reg. No. 380907-74-4), and di-μ-bromotetrachlorodialuminum ($Al_2Br_2Cl_4$, Reg. No. 162719-12-2). Aluminum trichloride can also be used as the catalyst as fed to the reaction mixture. In all of the embodiments of this invention, a preferred catalyst as fed to the reaction mixture is aluminum tribromide.

A catalyst solution suitable for either batch or continuous bromination can be easily prepared by combining solid $AlCl_3$ (a substance which is not soluble in bromine) and gaseous HBr in warm (40-50° C.) liquid bromine. A rapid halogen exchange produces a soluble bromoaluminum halide catalyst and HCl. Use of a catalyst of this type (with or without the copresence of HCl) is particularly preferred. An advantage of using a catalyst of this type is that the active brominating species (believed to be the bromonium ion, $Br^+$) is preformed, and thus the bromination of the anionic styrenic polymer initiates very rapidly and with high selectivity.

Product Sampling and Analysis Procedure for Bromobenzene

While other procedures may be employed for determining bromobenzene content of a brominated anionic styrenic polymer, use of the following Product Sampling and Analysis Procedure is a recommended procedure for use in determining whether a brominated anionic styrenic polymer satisfies the volatile bromobenzene content specifications of this invention. It is not a requirement that the Procedure be used for example on every quantity of product produced. The Procedure is for use only if and when a need or desire for a bromobenzene determination arises.

The Product Sampling and Analysis Procedure is as follows:

Although pentabromobenzene and hexabromobenzene can not be measured by proton NMR spectra, fortunately, the more volatile and undesirable odorous dibromo, tribromo, and tetrabromo species can be analyzed by use of this procedure. Proton NMR spectra are acquired using a Bruker DPX 400 MHZ instrument for solutions of about 10 wt % brominated anionic styrenic polymer in carbon disulfide/dichloromethane-$d_2$ (32 scans and 5 sec pulse delay). Trifluoroacetic acid (1 drop) is dissolved in each solution in the NMR tube prior to analysis. After setting the $CD_2Cl_2$ peak (triplet) to 5.3 ppm and baseline correcting the spectrum to remove contributions from the aromatic protons of the brominated anionic styrenic polymer, the following signals are integrated:

Singlet near 8.1 ppm for 1,2,4,5-tetrabromobenzene
Doublet near 7.8 ppm for 1,2,4-tribromobenzene
Singlet near 7.5 ppm for 1,4-dibromobenzene The integrals of the brominated anionic styrenic polymer aliphatic region (0.4 to 3.5 ppm) and aromatic region (5.6 to 8.2 ppm) are also obtained. Using these integrals and the molecular weights of the components of interest, the amount of each component is calculated. Summation of the amounts of 1,2,4,5-tetrabromobenzene, 1,2,4-tribromobenzene, and 1,4-dibromobenzene defines the volatile bromobenzene content of the brominated anionic styrenic polymer as used in this invention.

Proportioning of Catalyst

To achieve optimum results, the proportions of catalyst(s) of this invention in the range of about 0.8 mole percent or less relative to the anionic styrenic polymer used will vary somewhat depending for example on the composition of the catalyst, the optimum results to be achieved, and the makeup and monomeric formula weight of the anionic styrenic polymer being used. Based on results to date, with $AlCl_3$ added as the catalyst and anionic polystyrene with a monomeric formula weight of 104 daltons, proportions in the range of about 0.6 to about 0.8 mole % of $AlCl_3$ based on the anionic polystyrene being brominated are recommended. Note in this connection, the data in the Table A extracted from the more complete data in Table 1 hereinafter, which extracted data focus on the effect of the molar ratio of $AlBr_3$ to anionic polystyrene (APS). Relatively simple laboratory bromination experiments can be used in any other situations to optimize results when practicing this invention.

TABLE A

| Example | Ref. A | 1 | 2 | 3 |
|---|---|---|---|---|
| $AlBr_3$, mole % based on APS | 1.42 | 0.72 | 0.47 | 0.35 |
| Bromobenzenes formed, ppm (by NMR) | | | | |
| 1,4-dibromobenzene | 90 | 4 | 20 | 19 |
| 1,2,4-tribromobenzene | 320 | 0 | 90 | 0 |
| 1,2,4,5-tetrabromobenzene | 870 | 250 | 120 | 0 |

Note especially the large reduction in total dibromo-, tribromo-, and tetrabromo-benzene content (from 1280 ppm to ca. 250 ppm and lower) for the brominated APS products achieved at the lower catalyst loadings pursuant to this invention as shown in Table A. The work reported in Table 1 hereinafter further show that with the $AlBr_3$ catalyst level for the continuous bromination of APS of Example 2 is adequate to achieve high bromination (ca. 68 wt %) using a CSTR (continuous stirred tank reactor) average residence time of 8 minutes at a temperature of about 1° C. Also shown by the more complete data given in Table 1 hereinafter is that when the AlBr₃ level was reduced to the level of Example 3, bromination was limited to ca. 61 wt %, but bromobenzene formation was nearly eliminated (19 ppm) while product thermal stability remained high. These results thus indicate that a combination of continuous bromination and use of suitable reduced catalyst levels offers an opportunity to both lower costs and improve quality by significantly reducing bromobenzene impurity formation.

A reduction in bromobenzene formation was also found for batch bromination of APS when the aluminum halide catalyst level was reduced. Example 4 used about half the level of AlCl₃ as Reference Example B, and the product had about half the amount of bromobenzene impurities (see Table 2). An even greater reduction in bromobenzenes was observed for the product of Example 5 where the catalyst (AlBr₃) was fed to the reaction dissolved in the bromine feed stream. This metered introduction of catalyst to the batch reaction results in the same level of bromobenzene formation as a comparable continuous reaction (Example 1).

Brominated Anionic Styrenic Polymers of the Invention

Novel brominated anionic styrenic polymers can be produced by use of the process technology of this invention. In addition to reduced bromobenzene contents (no more than about 600 ppm, and preferably about 300 ppm or less), brominated anionic styrenic polymers of this invention have other desirable characteristics and properties. For example, besides bromine contents in the range of about 60 to about 71 wt % and low bromobenzene contents, the new brominated anionic styrenic polymers of this invention have very desirable thermal properties and color characteristics. These polymers can also have high melt flow indices. Preferred new brominated anionic styrenic polymers of this invention also have reduced percentages of aromatic rings with ortho-substituted bromine atoms. More preferred new brominated anionic styrenic polymers of this invention also either have (A) a thermal stability in the 320° C. Thermal Stability Test of 300 ppm or less of HBr (still more preferably 200 ppm of HBr or less and even more preferably 125 ppm of HBr or less) or (B) a thermal ΔE color value by the Hunter test of 15 or less (still more preferably 12 or less). Still more preferred new brominated anionic styrenic polymers of this invention also have both of these (A) and (B) properties.

Desirably, the GPC weight average molecular weight of the brominated anionic styrenic polymers of this invention is in the range of about 10,000 to about 30,000, and more preferably in the range of about 10,000 to about 20,000.

Particularly preferred brominated anionic styrenic polymers of this invention and especially the brominated anionic polystyrenes of this invention, have bromine contents in the range of about 60 to about 71 wt %, bromobenzene contents of no more than about 600 ppm, and more preferably about 300 ppm or less, and additionally at least one of the following properties:
1) a thermal ΔE color value of 15 or less;
2) a thermal stability in the 320° C. Thermal Stability Test of 125 ppm or less of HBr;
and optionally, at least one or both of:
3) a GPC number average molecular weight in the range of about 10,000 to about 15,000 and a polydispersity of about 1.25 or less;
4) an initial ΔE color value of 5 or less and still more preferably 3 or less.

Brominated anionic styrenic polymers of this invention and especially the brominated anionic polystyrenes of this invention, having any three or all four of additional properties of 1), 2), 3), and 4) are more preferred.

Of all of the brominated anionic styrenic polymers of this invention, the more preferred are brominated anionic polystyrene polymers.

REFERENCE TO THE DRAWINGS

Reference is now made to the Figures of the Drawings which schematically illustrate typical preferred systems for practicing the processes of this invention. These Figures are not intended to limit this invention to only the systems depicted.

FIG. 1, which is not to scale, schematically depicts a typical feeding system adapted for feeding a mixture of brominating agent and aluminum halide catalyst as a preformed mixed feed, and a solution of anionic styrenic polymer in a solvent as the other feed. In the form depicted, feeding system 10 is basically an annular mixing and injection device made of fluoropolymer, that is housed inside a glass-lined dip tube 12 for support. Dip tube 12 is typically made of exteriorly and interiorly glass coated carbon steel and is thus suitable for downward immersion into the bromination reaction mixture formed from the feeds. Conduits 14 and 16 are disposed within the interior of, and extend along much of the length of, dip tube 10. At its lower end portion, conduit 14 is constricted into a smaller diameter conduit 22. Conduit 16 at its lower portion 25 is turned inwardly within plug 18 so that the end portion of conduit 18 opens into mixing chamber 20 into which the flow from conduit 22 is directed. Plug 18 is tightly secured within the interior walls of dip tube 12 either by virtue of the size of its outer diameter vis-a-vis the inner diameter of dip tube 12 or by use of a plurality of annular sealing rings (not shown) disposed around the exterior of plug 18. In either case the bromination reaction mixture is thus prevented from passing upwardly into the interior space 26 of dip tube 12. Mixing chamber 20 is a sealed enclosure except for the entry openings for the feeds of conduits 22 and 25 and an axially disposed port opening into discharge conduit 28. Discharge conduit 28 is typically threaded at its upper exterior so that it is screw fitted into the lowermost portion of mixing chamber 20.

In operation, the preformed mixture of brominating agent and aluminum halide catalyst flows through conduits 14 and 22 and the solution of anionic styrenic polymer flows through conduits 16 and 25. At mixing chamber 20 the brominating agent and catalyst are traveling in a downward axial direction and the anionic styrenic polymer solution is traveling in a radially inward direction. Thus, the feeds intersect and impinge perpendicularly in mixing chamber 20 and then within 1 second or less, the resultant mixture is forced through discharge conduit 28 and outlet orifice 30 and into the bromination reaction mixture.

Typically conduits 14 and 16 are made of ¾-inch O.D. fluoropolymer tubing such as Teflon® polymer tubing with an I.D. of ⅝-inch. Conduits 22 and 25, plug 18 are also typically made of fluoropolymer. Conduit 22 typically has an I.D. of 0.466 inch. Conduit 25 typically has an I.D. of 0.3125 inch. Typically discharge conduit 28 has an I.D. of 0.375-inch. In the form depicted in FIG. 1, plug 18 and discharge port 28 therein extend about ¼ inch below the lowermost rim of dip tube 12. Dimensions of the schematically depicted feeding system of FIG. 1 can vary depending for example on the scale of operation.

In a typical plant scale operation for a 1714 kilogram/hour feed rate for a 10% solution of anionic polystyrene having a GPC number average molecular weight of 3500 and a feed rate of 712 kg/hour of bromine containing 0.44 wt % of $AlBr_3$, the residence time of the mixture forming in mixing chamber 20 is about $10^{-4}$ seconds.

Figure 2:
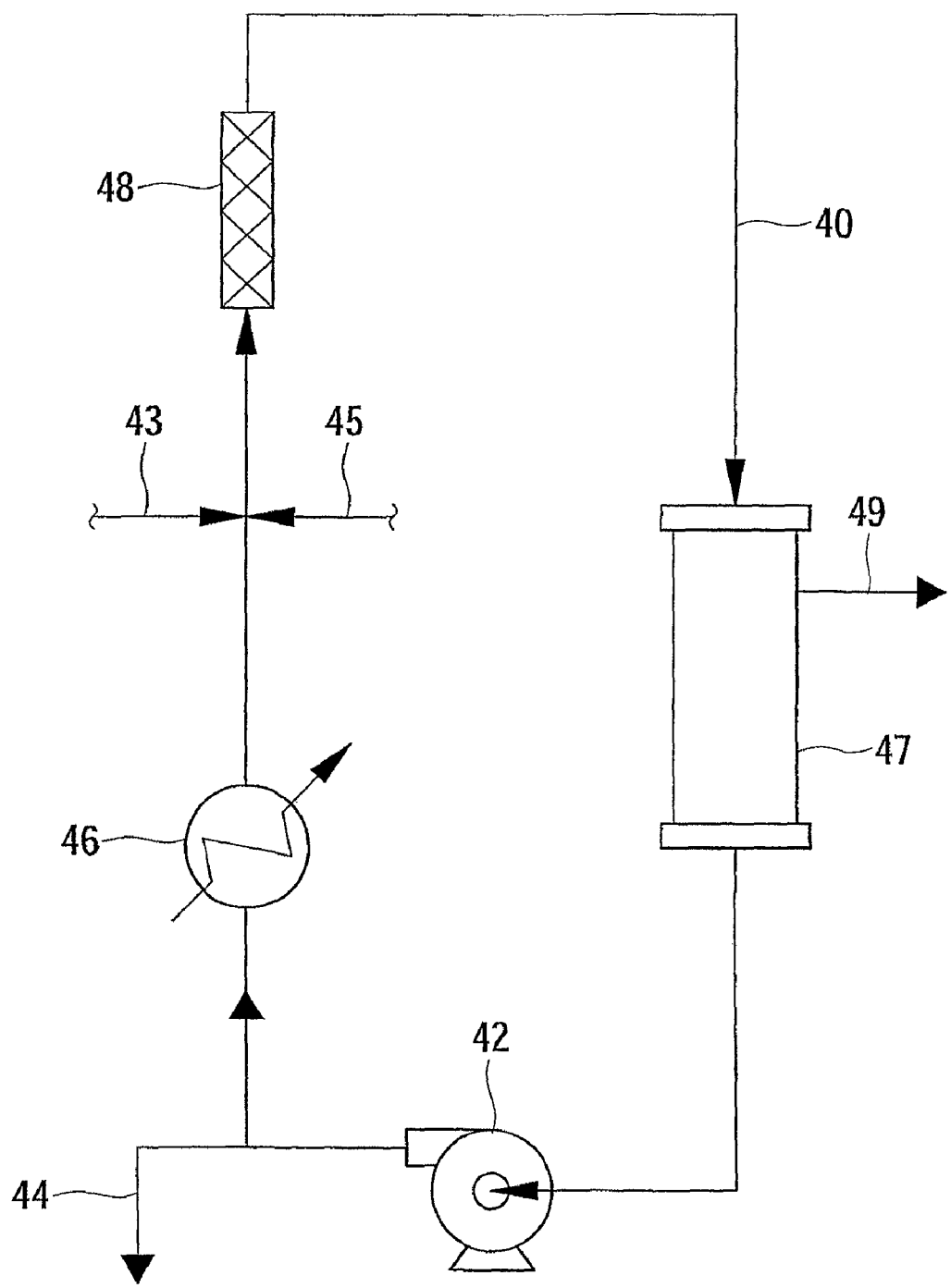
FIG. 2 is a schematic flow diagram of a system for conducting a continuous process in accordance with this invention.

The flow diagram of FIG. 2 schematically depicts one type of system that can be used for conducting a continuous process pursuant to this invention. Basically the system is composed of a loop type reactor 40, a pump 42 for circulating the reaction mixture including the HBr coproduct through reactor 40, a take-off line 44 for receiving from reactor 40 a portion of the circulating reaction mixture and transmitting such contents to a quench vessel (not shown), a dual injection system composed of injector 43 and injector 45, an indirect heat exchanger 46, and a static mixer 48. In the form depicted, heat exchanger 46 is disposed upstream from injectors 43 and 45 and downstream from pump 42 so as to remove heat generated by the action of pump 42, as well as heat from the exothermic bromination reaction. If desired, heat exchanger 46 can be placed at any other suitable place relative to reactor 40. Also more than one such heat exchanger can be employed in association with reactor 40 to remove heat at more than one location around the loop. Heat exchanger 46 is provided with a flow of suitable heat absorbing liquid such as cooling water and/or ethylene glycol.

As depicted, injectors 43 and 45 are in axial opposed alignment. Though not shown in the line drawing of FIG. 2, the orifices of injectors 43 and 45 are spaced apart from each other so that the contents of these respective injectors are forced directly toward each other and substantially at right angles into the reaction mixture flowing through reactor 40. Such an arrangement ensures very rapid contacting among the injected contents from the injectors and the reaction mixture flowing through the reactor. This in turn ensures highly rapid initiation of the bromination reaction.

Take-off line 44 as depicted continuously removes from reactor 40 a portion of the circulating reaction mixture. The contents of take-off line 44 are typically transported to and discharged into a vessel (not shown) containing a quenching liquid which promptly deactivates the catalyst.

Injector 43 receives and discharges a solution of anionic styrenic polymer in a suitable solvent whereas injector 45 receives and discharges a mixture of brominating agent such as bromine, and catalyst such as aluminum tribromide. If desired, three injectors (not shown) can be disposed around reactor 40, one for injecting solution of anionic styrenic polymer, another for injecting brominating agent (with or without solvent or diluent) and the third for injecting catalyst (with or without solvent or diluent) so that contact among the three injected streams occurs rapidly thus resulting in rapid initiation of bromination of styrenic polymer. In such a three-injector system the three injectors can be in any disposition relative to each other provided the injected contents from the injectors come into contact with each other rapidly, preferably within a matter of a few seconds. One such three injector arrangement involves disposing the injectors around reactor 40 with the respective axes of the three injectors in the same plane and radially spaced at about 120° intervals.

The system of FIG. 2 is typically operated at a pressure in the vicinity of 45 psig. A larger diameter tubular pressure relief drum 47 fabricated from fluoropolymer is disposed in an upright position in the loop of reactor 40, for example downstream from the locus of static mixer 48 and pump 42 (as shown) so that the flow of reaction mixture passes into the upper end and out of the lower end of drum 47. Drum 47 is closed except for entrance and exit ports at its ends (for intake and outflow of reaction mixture) and a lateral port near its upper end enabling hydrogen bromide gas (HBr) entrained in the reaction mixture that escapes from the reaction mixture due to the pressure drop within the drum, to exit through a lateral port into purge line 49 leading to a scrubber (not shown) containing a liquid to absorb the HBr from the gas stream that exits from drum 47 via line 49.

Figure 3:
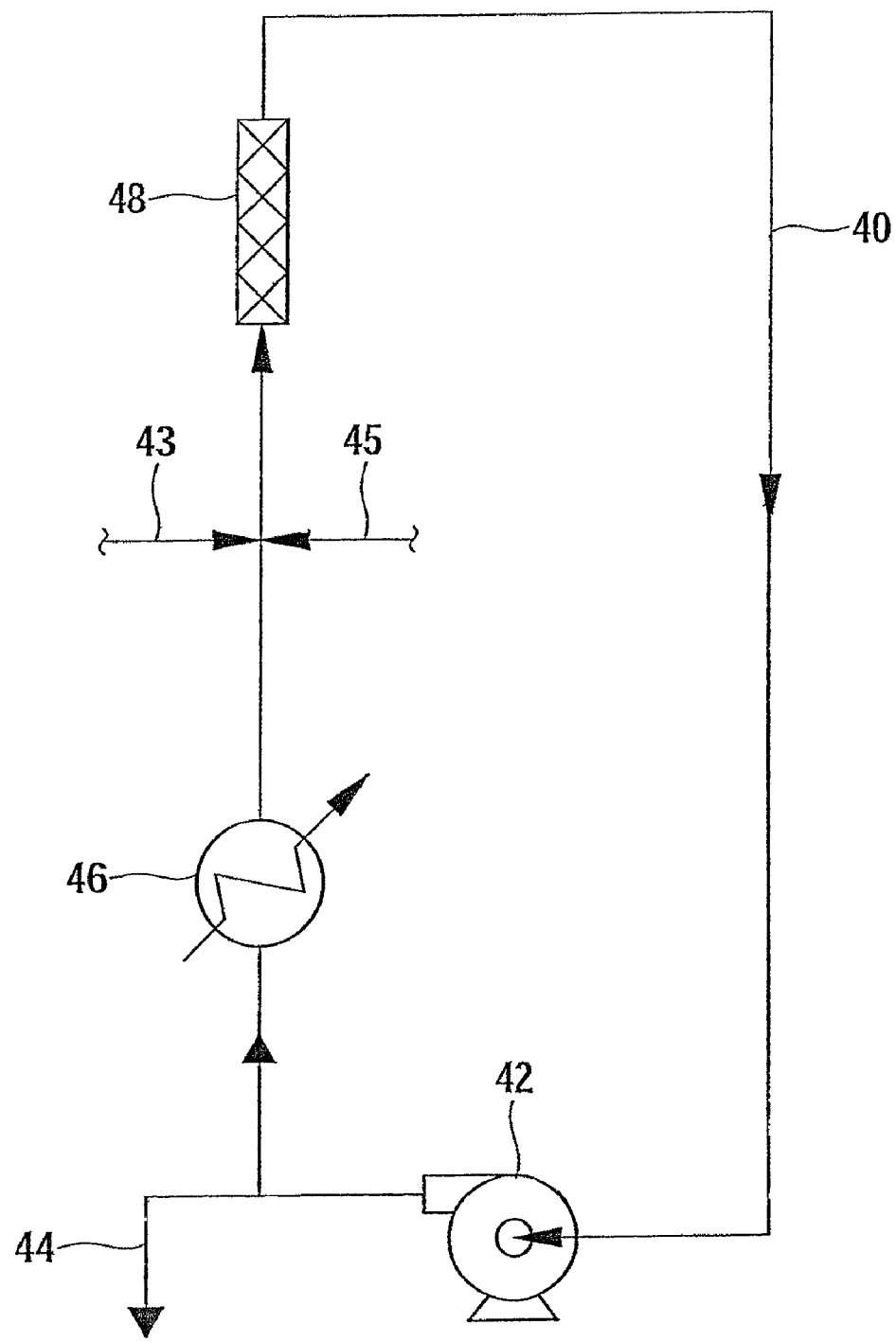
FIG. 3 is a schematic flow diagram for conducting a continuous process in accordance with a preferred embodiment of this invention.

A preferred feature of this invention schematically depicted in FIG. 3 is the discovery that, contrary to expectations, it is not necessary to purge HBr from a loop-type reaction system as is illustrated schematically in FIG. 2. The system depicted in FIG. 3 is identical to the system of FIG. 2 except that drum 47 and purge line 49 are absent. When operating the system of FIG. 3 at elevated pressures in the order of about 20 to about 60 and preferably at about 45 psig, all of the HBr coproduct formed can be retained in the liquid reaction mixture. This has the advantage not only of eliminating a need for a separate HBr scrubber from the overall system, but in addition all of the bromine values in the HBr can be recovered from the aqueous quench of the reaction mixture thus simplifying and reducing the cost of the recovery of such bromine values. Further, the retained HBr has been observed to reduce the viscosity of the reaction mixture. Such reduced viscosity would enable the bromination process to operate with less solvent or enable use of a moderately higher molecular weight anionic styrenic polymer with the same level of solvent.

Uses of the Brominated Anionic Styrenic Polymers

The brominated anionic styrenic polymers of this invention can be used as flame retardants for various polymeric materials such as thermoplastic and thermosetting polymeric materials and resins. The weight average molecular weights of the polymers that can be flame retarded pursuant to this invention can vary widely, from low molecular weight polymers to very high molecular weight polymers. Methods for producing the various thermoplastic or thermosetting polymers that can be flame retarded with the brominated anionic styrenic polymers of this invention are known to those of ordinary skill in the art. Other persons who may be unfamiliar with such matters, should refer to the extensive literature that exists on such subjects.

Preferably the brominated anionic styrenic polymers of this invention are used as additive flame retardants for various thermoplastic polymers. Thus among the embodiments of this invention are flame retardant compositions comprising at least one thermoplastic polymer and a flame retardant quantity of at least one brominated anionic styrenic polymer of this invention.

Particular thermoplastics with which the brominated anionic styrenic polymers of this invention can be blended pursuant to further embodiments of this invention include polyethylene terephthalate, polybutylene terephthalate, polycyclohexylene dimethylene terephthalate, polytrimethylene terephthalate, blends or mixtures of two or more of these, and analogous copolymeric thermoplastic polyesters, especially when filled or reinforced with a reinforcing filler such as glass fiber. Preferred thermoplastic polyesters are polyethylene terephthalate and polybutylene terephthalate. Polyamide thermoplastics, such as polyamide 6, polyamide 6,6, polyamide 12, etc., again preferably when glass filled, can also be effectively flame retarded in like manner. Other thermoplastic polymers that can be effectively flame retarded by addition of a brominated anionic styrenic polymer of this invention include but are not limited to styrenic polymers, high impact polystyrenes, crystal polystyrenes, polyolefins, ABS, MABS, SAN, aromatic polycarbonates, polyphenylene ethers, and polymer blends such as aromatic polycarbonate-ABS blends, polyphenylene ether-polystyrene blends, and similar substances. One group of thermoplastic polymers which can be effectively flame retarded by use of at least one brominated anionic styrenic polymer of this invention is (1) a thermoplastic styrenic polymer, (2) a thermoplastic acrylonitrile-butadiene-styrene polymer, (3) a thermoplastic polyester, or (4) a thermoplastic polyamide. Conventional additives, such as flame retardant synergists, antioxidants, UV stabilizers, pigments, impact modifiers, fillers, acid scavengers, blowing agents, and the like, can be included with the formulations as is appropriate. Preferred polymer blends of this invention do contain a flame retardant synergist or glass fiber filler or reinforcement, and most preferably both a synergist, and a reinforcing fiber and/or filler.

The brominated anionic styrenic polymer flame retardants of this invention are used in flame retardant amounts, which typically are within the range of from about 5 to about 25 wt %, the wt % being based on the total weight of the thermoplastic polymer formulation or blend. When used, the amount of reinforcing fillers such as glass fiber will typically be in the range of up to about 50 wt % based on the total weight of the finished composition. The amount of flame retardant synergist, when used, such as antimony trioxide, antimony pentoxide, sodium antimonate, potassium antimonate, iron oxide, zinc borate, or analogous synergist generally will be in the range of up to about 12 wt % based on the total weight of the finished composition. Departures from the foregoing ranges of proportions are permissible whenever deemed necessary or desirable under the particular circumstances at hand, and such departures are within the scope and contemplation of this invention.

Masterbatch compositions wherein the components except for the substrate thermoplastic polymer are in suitable relative proportions but are blended in a smaller amount of the substrate polymer, are also within the scope of this invention. Thus this invention includes compositions which comprise at least one thermoplastic polymer such as a polyalkylene terephthalate or a nylon polymer or a high impact polystyrene with which has been blended a brominated anionic styrenic polymer (preferably a brominated anionic polystyrene) of this invention in a weight ratio (substrate polymer:brominated polystyrene) in the range of, say, 1:99 to 70:30. Such masterbatch blends need not, but may also contain filler or reinforcing fiber and/or at least one flame retardant synergist such as iron oxide, zinc borate, or preferably an antimony oxide synergist such as antimony trioxide, antimony pentoxide, sodium antimonate, or potassium antimonate. Typical examples of reinforcing agents or fillers that can be used include low-alkali E-glass, carbon fibers, potassium titanate fibers, glass spheres or microballoons, whiskers, talc, wollastonite, kaolin, chalk, calcined kaolin, and similar substances. Sizing agents can be used with such reinforcing agents or fillers, if desired. A number of suitable glass-filled polyalkylene terephthalates or nylon molding compositions are available on the open market, and these can be used in preparing the compositions of this invention.

Also provided by this invention are additive blends composed of a brominated anionic styrenic polymer of this invention and a synergist such as, for example, a blend of 75 parts by weight of a brominated anionic polystyrene and 25 parts by weight of a synergist such as antimony trioxide, antimony pentoxide, sodium antimonate, potassium antimonate, iron oxide, zinc borate, or analogous synergist. Typically such blends will contain in the range of about 70 to about 98 parts by weight of the brominated anionic polystyrene and about 30 to about 2 parts by weight of the synergist, with the total of the two components being 100 parts by weight. Suitable amounts of other suitable additive components can also be included in such additive blends.

Various known procedures can be used to prepare the blends or formulations constituting such additional compositions of this invention. For example the polyalkylene terephthalate polymer or a nylon polymer and the brominated anionic styrenic polymer such as brominated anionic polystyrene and any other components or ingredients to be incorporated into the finished blend can be blended together in powder form and thereafter molded by extrusion, compression, or injection molding Likewise the components can be mixed together in a Banbury mixer, a Brabender mixer, a roll mill, a kneader, or other similar mixing device, and then formed into the desired form or configuration such as by extrusion followed by comminution into granules or pellets, or by other known methods.

Preferred thermoplastic compositions of this invention have the capability of forming molded specimens of 1.6 and 3.2 millimeter thickness (1/16 and 1/8-inch thickness) that pass at least the UL 94 V2 test.

Analytical Methods

Known analytical methods can be used or adapted for use in assaying the characteristics of the polymers of this invention. However, the following methods should be used for the sake of consistency.

Total Bromine Content. Since brominated anionic styrenic polymers have good, or at least satisfactory, solubility in solvents such as tetrahydrofuran (THF), the determination of the total bromine content for the brominated anionic styrenic polymers is easily accomplished by using conventional X-Ray Fluorescence techniques. The sample analyzed is a dilute sample, say 0.1±0.05 g brominated polystyrene in 60 mL THF. The XRF spectrometer can be a Phillips PW1480 Spectrometer. A standardized solution of bromobenzene in THF is used as the calibration standard. The total bromine values described herein and reported in the Examples are all based on the XRF analytical method.

Hunter Solution Color Value Test. To determine the color attributes of the brominated polymers of this invention, use is again made of the ability to dissolve brominated anionic styrenic polymers in easy-to-obtain solvents, such as chlorobenzene. The analytical method used is quite straight-forward. Weigh 5 g±0.1 g of the brominated polystyrene into a 50 mL centrifuge tube. To the tube also add 45 g±0.1 g chlorobenzene. Close the tube and shake for 1 hour on a wrist action shaker. After the 1 hour shaking period, examine the solution for undissolved solids. If a haze is present, centrifuge the solution for 10 minutes at 4000 rpm. If the solution is still not clear, centrifuge an additional 10 minutes. Should the solution remain hazy, then it should be discarded as being incapable of accurate measurement. If, however, and this is the case most of the time, a clear solution is obtained, it is submitted for testing in a HunterLab Color Quest Sphere Spectrocolorimeter. A transmission cell having a 20-mm transmission length is used. The colorimeter is set to "Delta E-lab" to report color as ΔE and to give color values for "L", "a" and "b". Product color is determined as total color difference, ΔE, using Hunter L, a, and b scales for the 10% by weight concentrations of the product in chlorobenzene versus chlorobenzene according to the formula:

$$\Delta E = [(\Delta L)^2 + (\Delta a)^2 + (\Delta b)^2]^{1/2}$$

320° C. Thermal Color Test. To determine thermal color of a sample, the 320° C. Thermal Stability Test apparatus is used. A 2.50±0.01 g portion of the sample is placed into each of four new clean 20×150 mm test tubes. With a neoprene stopper and Viton® fluoroelastomer tubing, each test tube is connected to a nitrogen purge line with exit gas from the test tube being vented to an aqueous caustic scrubber. With a constant nitrogen purge at 0.5 SCFH, the test tubes are heated at 320° C. in a molten salt bath (51.3% KNO$_3$/48.7% NaNO$_3$) for 15 minutes followed by 5 minutes at ambient temperature. The residues from each test tube are then combined to provide enough sample for a solution color measurement. A 5 g±0.1 g portion of the residue is weighed into a 50 mL centrifuge tube along with a 45 g±0.1 g portion of chlorobenzene. Close the tube and shake for 1 hour on a wrist action shaker. After the 1 hour shaking period, examine the solution for undissolved solids. If a haze is present, centrifuge the solution for 10 minutes at 4000 rpm. If the solution is still not clear, centrifuge an additional 10 minutes. Should the solution remain hazy, then it should be discarded as being incapable of accurate measurement. If, however, and this is the case most of the time, a clear solution is obtained, it is submitted for testing in a HunterLab Color Quest Sphere Spectrocolorimeter. A transmission cell having a 20-mm transmission length is used. The colorimeter is set to "Delta E-lab" to report color as $\Delta E$ and to give color values for "L", "a" and "b". Product color is determined as total color difference, $\Delta E$, using Hunter L, a, and b scales for the 10% by weight concentrations of the product in chlorobenzene versus chlorobenzene according to the formula:

$$\Delta E = [(\Delta L)^2 + (\Delta a)^2 + (\Delta b)^2]^{1/2}$$

DSC Values. DSC values are obtained with a TA Instruments DSC Model 2920. Samples are heated from 25° C. to 400° C. at 10° C./min under nitrogen.

Thermogravimetric Analysis. Thermogravimetric analysis (TGA) is also used to test the thermal behavior of the brominated anionic styrenic polymers of this invention. The TGA values are obtained by use of a TA Instruments Thermogravimetric Analyzer. Each sample is heated on a Pt pan from 25° C. to about 600° C. at 10° C./min with a nitrogen flow of 50-60 mL/min.

320° C. Thermal Stability Test. To determine thermal stability and estimate the corrosive potential of a sample, the 320° C. Thermal Stability Test is used. The test procedure is essentially as described in U.S. Pat. No. 5,637,650 except that the temperature used is 320° C. instead of 300° C. The reason for using a higher temperature is that the polymers of this invention do not evolve measurable amounts of HBr at 300° C. Thus, in conducting this test, each sample is run in duplicate. A 2.00±0.01 g sample is placed into a new clean 20×150 mm test tube. With a neoprene stopper and Viton® fluoroelastomer tubing, the test tube is connected to a nitrogen purge line with exit gas from the test tube being passed successively through subsurface gas dispersion frits in three 250-mL sidearm filter flasks each containing 200 mL of 0.1 N NaOH and 5 drops of phenolphthalein. With a constant nitrogen purge at 0.5 SCFH, the test tube is heated at 320° C. in a molten salt bath (51.3% KNO$_3$/48.7% NaNO$_3$) for 15 minutes followed by 5 minutes at ambient temperature. The test tube containing the sample is then replaced with a clean dry test tube, and the apparatus is purged with nitrogen for an additional 10 minutes with the empty test tube in the 320° C. salt bath. The test tube, tubing and gas dispersion tubes are all rinsed with deionized water, and the rinse is combined quantitatively with the solutions in the three collection flasks. The combined solution is acidified with 1:1 HNO$_3$ and titrated with 0.01 N AgNO$_3$ using an automatic potentiometric titrator (Metrohm 670, 716, 736, or equivalent). Results are calculated as ppm HBr, ppm HCl, and ppm HBr equivalents as follows:

ppm HBr=(EP1)(N)(80912)/(sample wt.)

ppm HCl=(EP2−EP1)(N)(36461)/(sample wt.)

ppm HBr equivalents=(EP2)(N)(80912)/(sample wt.)

where EP(x)=mL of AgNO$_3$ used to reach end point x; and N=normality of AgNO$_3$. The tubing is thoroughly dried with nitrogen before the next analysis. Each day before the first sample, three empty clean test tubes are run as blanks to assure there is no residual hydrogen halide in the system.

NMR Analyses

To determine the volatile bromobenzene content of the brominated anionic styrenic polymers, proton NMR spectra are acquired using a Bruker DPX 400 MHZ instrument for solutions of about 10 wt % brominated anionic styrenic polymer in carbon disulfide/dichloromethane-d$_2$ (32 scans and 5 sec pulse delay). Trifluoroacetic acid (1 drop) is dissolved in each solution in the NMR tube prior to analysis. After setting the CD$_2$Cl$_2$ peak (triplet) to 5.3 ppm and baseline correcting the spectrum to remove contributions from the aromatic protons of the brominated anionic styrenic polymer, the following signals are integrated:

Singlet near 8.1 ppm for 1,2,4,5-tetrabromobenzene

Doublet near 7.8 ppm for 1,2,4-tribromobenzene

Singlet near 7.5 ppm for 1,4-dibromobenzene

The integrals of the brominated anionic styrenic polymer aliphatic region (0.4 to 3.5 ppm) and aromatic region (5.6 to 8.2 ppm) are also obtained. Using these integrals and the molecular weights of the components of interest, the amount of each component is calculated. Summation of the amounts of 1,2,4,5-tetrabromobenzene, 1,2,4-tribromobenzene, and 1,4-dibromobenzene defines the volatile bromobenzene content of the brominated anionic styrenic polymer as used in this invention.

To determine the extent of ortho bromination of aromatic rings on the polymer, proton NMR spectra are acquired using a Bruker DPX 400 MHZ instrument at a probe temperature of 120° C. for solutions of about 20 wt % brominated polystyrene in 1,1,2,2,-tetrachloroethane-d$_2$. After normal processing and base line corrections, the area of the broad peaks are integrated between 3.8 to 2.2 ppm and 2.2 to 0.9 ppm. The sum of these two areas, after correction for end groups and residual solvent, represents the three chain protons per polymer repeat unit. The area from 3.8 to 2.2 ppm represents the chain methine proton where the associated aromatic ring has at least one ortho-bromine atom. The percentage of polymer units having ortho ring bromination is determined from these integrals.

GPC Weight Average Molecular Weights

The M$_w$ values are obtained by GPC using a Waters model 510 HPLC pump and, as detectors, a Waters Refractive Index Detector, Model 410 and a Precision Detector Light Scattering Detector, Model PD2000. The columns are Waters, μStyragel, 500 Å, 10,000 Å and 100,000 Å. The autosampler is a Shimadzu, Model Sil 9A. A polystyrene standard (M$_w$=185,000) is routinely used to verify the accuracy of the light scattering data. The solvent used is tetrahydrofuran, HPLC grade. The test procedure used entailed dissolving 0.015-0.020 g of sample in 10 mL of THF. An aliquot of this solution is filtered and 50 μL is injected on the columns. The separation is analyzed using software provided by Precision Detectors for the PD 2000 Light Scattering Detector.

Melt Flow Index Test. To determine the melt flow index of the brominated anionic styrenic polymers of this invention, the procedure and test equipment of ASTM Test Method D1238-00 are used. The extrusion plastometer is operated at 2.16 kg applied pressure and at a temperature of 220°. The samples used in the tests are neat unadulterated samples of the polymers being tested.

As used herein, "APS" designates anionic polystyrene, and "BrAPS" designates brominated anionic polystyrene. The term "M$_w$" means weight average molecular weight and the term "$M_n$" means number average molecular weight, both as determined by GPC (light scattering detector) described above. The term "CSTR" means continuous stirred tank reactor. "BCM" stands for bromochloromethane.

The following Examples illustrate the practice of this invention and are not intended to limit the generic scope of this invention.

Reference Example A

For this continuous bromination, two feed streams were pumped into the bottom of the glass reactor. The bromine stream, containing the dissolved $AlBr_3$ catalyst, and the APS solution in BCM were metered to the reactor using two separate pumps An 80-mL capacity glass CSTR was used for the reaction. The reactor had an outer insulating vacuum jacket and an inner jacket for circulating glycol coolant. The vessel had two inlet ports on the bottom for delivery of reagent solutions directly under the bottom turbine blade of the dual Teflon turbine agitator (operated at 400 rpm). An overflow port located just above the top turbine blade allowed the reaction mixture to flow by gravity to a splitter that could direct the flow to the main product quench pot (5-L fully jacketed round bottom flask with paddle stirrer) or a secondary waste quench pot (2-L Erlenmeyer with magnetic stirrer). Exit gases from the CSTR passed overhead through a Friedrich's condenser and into an aqueous caustic scrubber with assistance from a constant nitrogen purge at the top of the condenser. During the bromination, room and hood lights were turned off and the reactor was wrapped with aluminum foil to minimize photobromination.

Two identical pumps (Ismatec peristaltic pump, Cole-Parmer SY-78017-00) were used to deliver the bromine/$AlBr_3$ and APS/BCM solutions to the CSTR using feed lines of Teflon polymer (1/8") and Viton polymer (0.10", Cole-Parmer, SY-07605-46). The operation was started by charging the CSTR with dry BCM (173.7 g) and cooling the contents of the reactor to −6° C. The bromine solution (5.44 g $AlBr_3$ in 618.2 g $Br_2$) and APS solution (150.0 g APS in 1350.0 g BCM, 10.0 wt % APS) feeds to the reactor were started at the same time and both were held constant for the entire operation. The average bromine feed rate was 1.90 ml/min and the average APS feed rate was 7.60 ml/min. For the first 30 min of operation, the overflow stream from the CSTR was directed to the waste quench pot (containing 530 g of 5 wt % aqueous $Na_2SO_3$). After this point, the overflow stream was diverted to the main quench pot (containing 865 g of 4 wt % aqueous $Na_2SO_3$) to collect the steady state product until the feed solutions were depleted (77 min). The CSTR temperature was +2° C. during the steady state operation. The average residence time for the reaction mass in the CSTR was 8 min. The organic phase in the main quench pot was transferred to a 2-L separatory funnel. Three aqueous washes (800 g each) were used to remove residual acid and salts.

The neutralized organic phase was pumped into 4-L of vigorously stirred hot (98° C.) water to obtain a slurry of white finely divided solid in water. The slurry was suction filtered, and the solid was rinsed on the filter with water (3×2 L). The wet cake was dried in a nitrogen purged oven at 130° C. to a constant weight of 317.5 g. Analytical results are summarized in Table 1.

Example 1

This example of the present invention was carried out as described in Reference Example A, except the amount of $AlBr_3$ catalyst was reduced from 5.44 g (1.42 mole % based on APS) to 2.76 g (0.72 mole %). Analyses for the steady state product are summarized in Table 1.

Example 2

This example of the present invention was also carried out as described in Reference Example A, except the amount of $AlBr_3$ catalyst was reduced from 5.44 g (1.42 mole % based on APS) to 1.80 g (0.47 mole %). Analyses for the steady state product are summarized in Table 1.

Example 3

This example of the present invention was carried out as described in Reference Example A, except the amount of $AlBr_3$ catalyst was reduced from 5.44 g (1.42 mole % based on APS) to 1.36 g (0.35 mole %). The incomplete reaction of bromine in the CSTR required the use of more sodium sulfite solution in the main quench vessel (1300 g of 8.0 wt %) to neutralize the excess $Br_2$, but the rest of the product isolation procedure was unchanged. Analyses for the steady state product are summarized in Table 1.

TABLE 1

CONTINUOUS BROMINATION OF APS USING $AlBr_3$ CATALYST

| Example | Ref. A | 1 | 2 | 3 |
|---|---|---|---|---|
| APS GPC Analyses | | | | |
| $M_n$ | 3400 | 3400 | 3400 | 3400 |
| $M_w$ | 3800 | 3800 | 3800 | 3800 |
| $AlBr_3$, mole % based on APS | 1.42 | 0.72 | 0.47 | 0.35 |
| (% of standard catalyst amount) | (001) | (05) | (33) | (52) |
| CSTR reaction temp. (° C.) | 2 | 3 | 1 | 1 |
| APS Feed Concentration (wt %) | 10.0 | 10.0 | 10.0 | 10.0 |
| CSTR ave. residence time (min) | 8 | 8 | 8 | 8 |
| HP-3010 Product Analyses | | | | |
| Wt % Br (XRF) | 68.5 | 68.7 | 67.8 | 61.5 |
| MFI (g/10 min, 220° C./2.16 kg) | 3.1 | 2.1 | 5.7 | 112 |
| Thermal HBr (320° C./15 min) | 147 | <50 | 93 | 66 |
| Thermal Color (320° C./15 min) | | | | |
| L | 96.14 | 97.29 | 95.98 | 92.21 |
| a | −2.83 | −1.86 | −1.44 | −0.61 |
| b | 14.30 | 10.26 | 10.41 | 11.50 |
| ΔE | 15.09 | 10.81 | 11.36 | 14.17 |

TABLE 1-continued

CONTINUOUS BROMINATION OF APS USING AlBr₃ CATALYST

| Example | Ref. A | 1 | 2 | 3 |
|---|---|---|---|---|
| Initial Color, 10 wt % in chlorobenzene | | | | |
| L | 99.75 | 100.00 | 99.36 | 99.75 |
| a | 0.02 | −0.11 | 0.02 | −0.37 |
| b | 0.91 | 0.97 | 1.46 | 1.89 |
| ΔE | 1.11 | 1.01 | 1.75 | 2.02 |
| DSC, $T_g$ (° C.) | 162.7 | 166.9 | 164.8 | 143.5 |
| TGA 1% wt loss temp., $N_2$ (° C.) | 354.6 | 358.2 | 366.1 | 366.4 |
| BrAPS GPC | | | | |
| $M_n$ | 13,300 | 13,300 | 13,050 | 10,450 |
| $M_w$ | 13,400 | 13,500 | 13,200 | 11,500 |
| % rings with ortho-Br NMR (ppm) | 77.7 | 77.4 | 71.3 | 35.2 |
| 1,4-Dibromobenzene | 90 | 4 | 20 | 19 |
| 1,2,4-Tribromobenzene | 320 | 0 | 90 | 0 |
| 1,2,4,5-Tetrabromobenzene | 870 | 250 | 120 | 0 |

Example A illustrates advantages of a process in which a short reaction time and low reaction temperature are used. Examples 1, 2, and 3 illustrate the further advantage, pursuant to this invention, of using in a continuous process a reduced aluminum halide catalyst level along with a short reaction time and low reaction temperature. In particular, as seen from Table 1, the combination of these features substantially reduced bromobenzene content of the brominated anionic styrenic polymer product as produced. Also, thermal properties such as thermal HBr and thermal color were further improved.

Reference Example B

In this batch bromination, a 2.33 g (17.5 mmol, 1.43 mol %) portion of aluminum chloride (Aldrich) was suspended in 500.2 g of dry (<15 ppm water) BCM in a 1-L, 5-necked, jacketed, glass reaction flask cooled to −6° C. by a circulating glycol bath. The reaction flask having a flush-mount Teflon bottom valve was equipped with an overhead air stirrer and Teflon banana-blade paddle, Friedrich's condenser (glycol cooled), and thermowell. A constant flow of dry nitrogen was maintained on the vent line from the condenser to assist in moving exit gases from the flask to a caustic scrubber. A 315.0 g (127.6 g APS, 1.225/n mol) portion of the 40.5 wt % solution of anionic polystyrene in dry BCM was charged to a 500-mL graduated cylinder in a dry box. The graduated cylinder was then set up to pump the APS solution from the cylinder to a jacketed, glycol-cooled glass mixing tee mounted on the reaction flask. Bromine (529.0 g, 3.310 moles, 2.70 equivalents) was charged to a 250-mL graduated cylinder and set up to pump the bromine to the same mixing tee as the APS solution. Both streams were cooled separately by the mixer before combining at the bottom of the apparatus and dropping into the bromination flask. The reaction mixture was protected from photo-initiated aliphatic bromination by turning off hood lights and wrapping the flask and mixing tee with Al foil. Both feeds were started at the same time and were both completed in 61 min. A rinse of 99.1 g of dry BCM was used for the APS solution feed system to assure complete transfer of the polymer to the reaction flask while nitrogen was flushed through the bromine feed system to give quantitative transfer of the bromine. The reaction temperature was maintained at −2° C. to +1° C. throughout the addition and subsequent 15 min cook period (with nitrogen purge of the reactor overhead). The catalyst was deactivated by addition of 40 g of water. A 26.5 g portion of 10 wt % aqueous sodium sulfite was then added to assure the removal of any residual bromine. The organic phase was separated, and then washed with 800 mL portions of water, dilute caustic, and water. The product was recovered from the washed organic phase by addition to vigorously stirred hot (98° C.) water. The solvent distilled from the hot water leaving a slurry of the brominated polystyrene product in water. After suction filtering, the white solid was rinsed with water (3×2 L) and dried to a constant weight of 382.5 g (98% yield) in an oven (130° C.) under a constant nitrogen purge. Product analyses appear in Table 2.

Reference Example C

In this batch bromination that was carried out in a similar manner to Reference Example B, reaction time was reduced from about 76 minutes to 35 minutes, and the catalyst was changed from $AlCl_3$ to $AlBr_3$. A 2.53 g (9.49 mmol, 1.41 mol %) portion of aluminum bromide (Alfa Aesar) was suspended in 772.4 g of dry (<15 ppm water) BCM in a 1-L, 5-necked, jacketed, glass reaction flask cooled to −3° C. by a circulating glycol bath. The reaction flask having a flush-mount Teflon bottom valve was equipped with an overhead air stirrer and Teflon banana-blade paddle, Friedrich's condenser (glycol cooled), and thermowell. A constant flow of dry nitrogen was maintained on the vent line from the condenser to assist in moving exit gases from the flask to a caustic scrubber. A 174.3 g (70.6 g APS, 0.678/n mol) portion of the 40.5 wt % solution of anionic polystyrene in dry BCM was charged to a 250-mL graduated cylinder in a dry box. The graduated cylinder was then set up to pump the APS solution from the cylinder to a jacketed, glycol-cooled glass mixing tee mounted on the reaction flask. Bromine (289.9 g, 1.814 mol, 2.68 equivalents) was charged to a 250-mL graduated cylinder and set up to pump the bromine to the same mixing tee as the APS solution. Both streams were cooled separately by the mixer before combining at the bottom of the apparatus and dropping into the bromination flask. The reaction mixture was protected from photo-initiated aliphatic bromination by turning off hood lights and wrapping the flask and mixing tee with Al foil. Both feeds were started at the same time and were both completed in 30 min. A rinse of 100.2 g of dry BCM was used for the APS solution feed system to assure complete transfer of the polymer to the reaction flask while nitrogen was flushed through the bromine feed system to give quantitative transfer of the bromine. The reaction temperature was maintained at −1° C. to +3° C. throughout the addition and subsequent 5 min cook period (with nitrogen purge of the reactor overhead). The catalyst was deactivated by addition of 40 g of water. A 12.8 g portion of 10 wt % aqueous sodium sulfite was then added to assure the removal of any residual bromine. The organic phase was separated, and then washed with 1100 mL portions of water, dilute caustic, and water. The product was recovered from the washed organic phase by addition to vigorously stirred hot (98° C.) water. The solvent distilled from the hot water leaving a slurry of the brominated polystyrene product in water. After suction filtering, the white solid was rinsed with water (3×2 L) and dried to a constant weight of 205.4 g (95% yield) in an oven (130° C.) under a constant nitrogen purge. Product analyses appear in Tables 2.

Example 4

This batch bromination was carried out as described for Reference Example B using the same anionic polystyrene, but with a lower $AlCl_3$ level (1.22 g, 9.15 mmol, 0.75 mol %). Both the bromine and APS feeds were started at the same time and were both completed in 60 min. The reaction temperature was maintained at −2° C. to 0° C. throughout the addition and subsequent 15 min cook period (with nitrogen purge of the reactor overhead). The catalyst was deactivated by addition of 40 g of water. A 19.2 g portion of 10 wt % aqueous sodium sulfite was then added to assure the removal of any residual bromine. The organic phase was separated, and then washed with water, dilute sodium hydroxide, and finally water to neutralize acid and remove NaBr. The product was recovered from the organic phase by addition to vigorously stirred hot (98° C.) water. The solvent distilled from the hot water leaving a slurry of the brominated polystyrene product in water. After suction filtering, the white solid was rinsed with water (3×2 L) and dried to a constant weight of 378.9 g (97% yield) in an oven (130° C.) under a constant nitrogen purge. Product analyses are given in Table 2.

Example 5

In this example, the batch bromination described in Reference Example B was modified by removing the glass mixing tee and securing the two feed lines together to form a dipleg that delivered the two reagent streams under the surface of the solvent in the reaction flask. In addition, $AlBr_3$ catalyst was used in place of $AlCl_3$ and it was dissolved in the bromine feed stream instead of being charged to the reaction flask with the initial solvent charge. The 1-L five-necked fully jacketed reaction flask was charged with 499.9 g dry BCM and cooled to −5° C. The reactant solutions were then pumped into the cold solvent using an average rate of 2.69 mL/min for the bromine/$AlBr_3$ solution (526.6 g $Br_2$ and 2.33 g $AlBr_3$) and 3.81 mL/min for the APS/BCM solution (315.2 g of 40.5 wt % solution). Both streams were started at the same time. The bromine feed finished in 64 min and the APS feed ended in 57 min. The reaction temperature was maintained at −3° C. to +1° C. throughout the addition and subsequent 15 min cook period (with nitrogen purge of the reactor overhead). The catalyst was deactivated by addition of 40 g of water. A 20.8 g portion of 10 wt % aqueous sodium sulfite was then added to assure the removal of any residual bromine. The organic phase was separated, and then washed with water, dilute sodium hydroxide, and finally water to neutralize acid and remove NaBr. The product was recovered from the organic phase by addition to vigorously stirred hot (98° C.) water. The solvent distilled from the hot water leaving a slurry of the brominated polystyrene product in water. After suction filtering, the white solid was rinsed with water (3×2 L) and dried to a constant weight of 381.4 g (98% yield) in an oven (110° C.) under a constant nitrogen purge. Product analyses are given in Table 2.

Example 6

This continuous bromination was carried out similar to Example 1, but using the same concentrated APS feed solution used for the batch reaction (Reference Examples B and C and Examples 4 and 5). The operation was started by charging the 80-mL glass CSTR with dry BCM (163.0 g) and cooling the contents of the reactor to −7° C. The bromine solution (2.29 g $AlBr_3$ in 525.0 g $Br_2$) and APS solution (127.5 g APS in 187.3 g BCM, 40.5 wt % APS) feeds to the reactor were started at the same time and both were held constant for the entire operation. The bromine feed rate was 2.87 ml/min and the APS feed rate was 3.62 ml/min. The CSTR temperature varied from 0° C. to +10° C. during the operation. For the first 25 min, the overflow stream from the CSTR was directed to the waste quench pot (containing 635 g of 4 wt % aqueous $Na_2SO_3$). After this point, the very viscous overflow stream was diverted to the main quench pot (containing 520 g of 4 wt % aqueous $Na_2SO_3$) to collect the steady state product. The average residence time for the reaction mass in the CSTR was 13 min. The viscous organic phase in the main quench pot was diluted with BCM (288 g), and the lower organic phase was then transferred to a 2-L separatory funnel. Two aqueous washes (900 g each) were used to remove residual acid and salts. The neutralized organic phase was pumped into 4-L of vigorously stirred hot (98° C.) water to obtain a slurry of white finely divided solid in water. The slurry was suction filtered, and the solid was rinsed on the filter with water (3×2 L). The wet cake (89 g) was dried in a nitrogen purged oven at 130° C. to a constant weight of 45.7 g. Analytical results are summarized in Table 2.

TABLE 2

APS BROMINATION RESULTS

| Example | Ref B | Ref C | 4 | 5 | 6 |
|---|---|---|---|---|---|
| Bromination Process | Batch | Batch | Batch | Batch | Continuous |
| Catalyst | $AlCl_3$ | $AlBr_3$ | $AlCl_3$ | $AlBr_3$ in $Br_2$ | $AlBr_3$ in $Br_2$ |
| $AlX_3$, mole % | 1.43 | 1.41 | 0.75 | 0.72 | 0.70 |
| Maximum reaction Temp (° C.) | +1 | +3 | 0 | 0 | +10 |
| Total reaction time or ave. residence time (min) | 76 | 35 | 75 | 79 | 13 |
| APS feed concentration (wt %) | 40.5 | 40.5 | 40.5 | 40.5 | 40.5 |
| APS $M_n$ | 3400 | 3400 | 3400 | 3400 | 3400 |

TABLE 2-continued

APS BROMINATION RESULTS

| Example | Ref B | Ref C | 4 | 5 | 6 |
|---|---|---|---|---|---|
| APS $M_w$ | 3800 | 3800 | 3800 | 3800 | 3800 |
| Wt % Br (XRF) | 67.3 | 67.9 | 68.1 | 67.6 | 67.0 |
| Thermal HBr, 320° C./15 min/$N_2$ (ppm) | 90 | 180 | 119 | 76 | 104 |
| Thermal color, (320° C./15 min/$N_2$), 10 wt % in chlorobenzene | | | | | |
| L | 93.69 | 89.83 | 95.45 | 95.67 | 88.30 |
| a | −3.32 | −3.32 | −2.31 | −1.91 | −2.62 |
| b | 21.86 | 30.74 | 14.80 | 13.70 | 31.67 |
| ΔE | 22.99 | 32.58 | 15.70 | 14.56 | 33.88 |
| Initial Color, 10 wt % in chlorobenzene | | | | | |
| L | 99.63 | 99.50 | 99.66 | 99.24 | 99.22 |
| a | −0.71 | −0.45 | −0.61 | −0.55 | −0.64 |
| b | 2.75 | 2.64 | 2.47 | 2.92 | 3.61 |
| ΔE | 2.92 | 2.81 | 2.63 | 3.16 | 3.82 |
| DSC, $T_g$ (° C.) | 167.4 | 168.6 | 166.0 | 159.9 | 162.6 |
| TGA 1% wt loss temp, $N_2$ (° C.) | 355.4 | 354.1 | 352.8 | 362.3 | 349.2 |
| BrAPS GPC | | | | | |
| $M_n$ | 13,000 | 12,800 | 13,000 | 13,200 | 12,100 |
| $M_w$ | 13,200 | 13,200 | 13,500 | 13,400 | 12,400 |
| % Aromatic rings with ortho-Br (NMR) | 77.0 | 76.1 | 72.9 | 69.7 | 66.8 |
| MFI (g/10 min, 220° C./2.16 kg) | 5.3 | 5.2 | 5.7 | 7.5 | 12.1 |
| NMR (ppm) | | | | | |
| 1,4-dibromobenzene | 270 | 640 | 60 | 40 | 126 |
| 1,2,4-tribromobenzene | 450 | 1040 | 240 | 130 | 370 |
| 1,2,4,5-tetrabromobenzene | 380 | 280 | 220 | 70 | 1100 |

The high bromobenzene contents in the product of Example 6 are attributed to the fact that in the continuous mode of operation, the feed stream of the APS in the organic solvent was too concentrated and thus resulted in a overly viscous reaction mixture. This mixture proved difficult to handle during workup. Thus, when conducting a continuous operation, the concentration of the APS in the solution being fed to the reaction zone should be kept more dilute. See in this connection the results achieved in Examples 1-3 of Table 1.

Other embodiments pursuant to the invention are as follows:

A). A process of preparing brominated anionic styrenic polymer having a reduced volatile bromobenzene content, which process comprises:

A) concurrently feeding into a reaction zone components comprised of (i) a brominating agent, (ii) aluminum halide catalyst in which the halide atoms are bromine or chlorine or both, and (iii) anionic styrenic polymer having a GPC number average molecular weight in the range of about 2000 to about 30,000 in the form of a solution or slurry in a solvent to form a reaction mixture, wherein said components are fed (1) individually as at least three separate feeds or (2) as at least two separate feeds, one feed of which contains no more than two of (i), (ii), and (iii), and another feed of which contains the third of (i), (ii), (iii) either individually or in combination with no more than one other of (i), (ii), and (iii), to thereby form a reaction mixture containing a liquid phase, and maintaining said reaction mixture at about 10° C. or less whereby bromination of anionic styrenic polymer occurs, the components being proportioned such that the amount of aluminum halide being fed is at about 0.8 mole percent or less in relation to the molar amount of aromatic monomer units in the anionic styrenic polymer being fed, and such that the dried brominated anionic styrenic polymer referred to in C) hereinafter will have a bromine content in the range of about 60 to about 71 wt %;

B) deactivating the catalyst in, and washing away bromide ions and catalyst residues from
  1) substantially the entire reaction mixture or
  2) portions of the reaction mixture that have exited from the reaction zone; and C) recovering brominated anionic styrenic polymer product from the reaction mixture and drying such product whereby the dried brominated anionic styrenic polymer has a bromine content in the range of about 60 to about 71 wt % and a volatile bromobenzene content which is no more than about 600 ppm (wt/wt).

B). A process as in A) wherein said concurrent feeds in A) are continuous feeds.

C). A process as in A) wherein said concurrent feeds in A) are pulsed feeds.

D). A process as in A) wherein at least one said concurrent feed in A) is a continuous feed and at least one said concurrent feed in A) is a pulsed feed.

E). A process as in A) wherein said components (i), (ii), and (iii) are fed individually as at least three separate feeds.

F). A process as in A) wherein said components (i), (ii), and (iii) are fed as at least two separate feeds, one feed of which contains no more of two of (i), (ii), and (iii), and another feed of which contains the third of (i), (ii), (iii) either individually or in combination with no more than one other of (i), (ii), and (iii).

G). A process as in F) wherein each of said at least two separate feeds enters into the reaction zone proximate to the other feed stream or streams.

H). A process as in F) wherein each of said at least two separate feeds enters into the reaction zone in substantial face-to-face opposed alignment.

I). A process as in B) wherein said components (i), (ii), and (iii) are fed individually as at least three separate feeds.

J). A process as in B) wherein said components (i), (ii), and (iii) are fed as at least two separate feeds, one feed of which contains no more of two of (i), (ii), and (iii), and another feed of which contains the third of (i), (ii), (iii) either individually or in combination with no more than one other of (i), (ii), and (iii).

K). A process as in any of A)-J) wherein said brominating agent is bromine and wherein said GPC number average molecular weight is in the range of about 2000 to about 10,000.

L). A process as in K) wherein said GPC number average molecular weight is in the range of about 3000 to about 7000.

M). A process as in E) wherein each of said at least two separate feeds enters into the reaction zone proximate to the other feed stream or streams.

N). A process as in E) wherein each of said at least two separate feeds enters into the reaction zone in substantial face-to-face opposed alignment.

O). A process as in A) wherein said components (i), (ii), and (iii) are fed as at least two separate feeds, a first stream which is formed from bromine and said catalyst and a second stream which is anionic styrenic polymer having a GPC number average molecular weight in the range of about 2000 to about 30,000 in the form of a solution or slurry in a solvent; and wherein said first and second streams enter into the reaction zone proximate to each other.

P). A process as in O) wherein said brominating agent is bromine and wherein said GPC number average molecular weight is in the range of about 2000 to about 10,000.

Q). A process as in P) wherein said GPC number average molecular weight is in the range of about 3000 to about 7000.

R). A process as in A) wherein said components (i), (ii), and (iii) are fed as at least two separate feeds, a first stream which is formed from bromine and said catalyst and a second stream which is anionic styrenic polymer having a GPC number average molecular weight in the range of about 2000 to about 30,000 in the form of a solution or slurry in a solvent; and wherein said first and second streams enter into the reaction zone in substantial face-to-face opposed alignment.

S). A process as in R) wherein said brominating agent is bromine and wherein said GPC number average molecular weight is in the range of about 2000 to about 10,000.

T). A process as in S) wherein said GPC number average molecular weight is in the range of about 3000 to about 7000.

U). A process as in any of A)-J) or O)-T) wherein the catalyst is deactivated by quenching the reaction mixture with and recovering the HBr coproduct in an aqueous quenching medium.

V). A process as in any of A)-J) or O)-T) wherein A) is conducted in a closed reaction system under autogenous pressure so that hydrogen bromide coproduct is kept in said reaction mixture until the catalyst is deactivated.

W). A process as in any of A)-J) or O)-T) wherein said anionic styrenic polymer is anionic polystyrene.

X). A process as in any of A)-J) or O)-T) conducted as a continuous process.

Y). A process as in any of A)-J) or O)-T) conducted as a batch process.

Z). A process as in any of A)-J) or O)-T) wherein said solvent comprises (a) at least one liquid saturated aliphatic chlorohydrocarbon, (b) at least one liquid saturated aliphatic bromohydrocarbon, or (c) at least one liquid saturated aliphatic bromochlorohydrocarbon, or a mixture comprised of any two or all three of (a), (b), and (c).

As used anywhere herein including the claims, the terms "continuous" and "continuously" denote that the operation referred to ordinarily proceeds without interruption in time provided however that an interruption is permissible if of a duration that does not disrupt steady-state conditions of that operation. If the interruption is of a duration that disrupts steady-state operation, a steady state condition of operation should be achieved before resuming collection of the product.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what preliminary chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

That which is claimed is:

1. A brominated anionic styrenic polymer having a bromine content in the range of about 67 to about 69 wt %, a volatile bromobenzene content of no more than about 600 ppm, and the following properties:
   1) a thermal ΔE color value of about 15 or less, determined at 320° C.;
   2) a thermal stability in the 320° C. Thermal Stability Test of about 125 ppm or less of HBr; and
   3) an initial ΔE color value of about 5 or less.

2. A brominated anionic styrenic polymer as in claim 1 additionally having the following additional properties:
   a) a GPC number average molecular weight in the range of about 10,000 to about 15,000 and a polydispersity of about 1.25 or less; and
   b) an initial ΔE color value of about 3 or less.

3. A brominated anionic styrenic polymer as in claim 1 wherein said volatile bromobenzene content is about 300 ppm or less.

4. A brominated anionic styrenic polymer as in claim 2 wherein said volatile bromobenzene content is about 300 ppm or less.

5. A brominated anionic styrenic polymer as in claim 1 wherein said brominated anionic styrenic polymer is brominated anionic polystyrene.

6. A brominated anionic styrenic polymer as in claim 2 wherein said brominated anionic styrenic polymer is brominated anionic polystyrene.

7. A brominated anionic styrenic polymer as in claim 3 wherein said brominated anionic styrenic polymer is brominated anionic polystyrene.

8. A brominated anionic styrenic polymer as in claim 4 wherein said brominated anionic styrenic polymer is brominated anionic polystyrene.

9. A brominated anionic styrenic polymer having a bromine content in the range of about 67 to about 69 wt %, a volatile bromobenzene content of no more than about 600 ppm, and the following properties:
  1) a thermal ΔE color value of about 15 or less, determined at 320° C.;
  2) a thermal stability in the 320° C. Thermal Stability Test of about 125 ppm or less of HBr; and
  3) an initial ΔE color value of about 5 or less,
wherein said brominated anionic styrenic polymer is prepared by a continuous process, which process comprises:
  A) concurrently feeding into a reaction zone components comprised of (i) a brominating agent, (ii) aluminum halide catalyst in which the halide atoms are bromine or chlorine or both, and (iii) anionic styrenic polymer having a GPC number average molecular weight in the range of about 2000 to about 30,000 in the form of a flowable solution in a solvent to form a reaction mixture, wherein said components are fed (1) individually as at least three separate feeds or (2) as at least two separate feeds, one feed of which contains no more than two of (i), (ii), and (iii), and another feed of which contains the third of (i), (ii), (iii) either individually or in combination with no more than one other of (i), (ii), and (iii), to thereby form a reaction mixture containing a liquid phase, and maintaining said reaction mixture at about 10° C. or less whereby bromination of anionic styrenic polymer occurs, said feeds of (1) or (2) hereof being fed as continuous or pulsed feeds and the rate at which the reaction mixture exits from the reaction zone in relation to the rate of the feeding of said feeds of (1) or (2) into the reaction zone being such that the volume of the traveling contents of the reaction zone remains substantially constant, the components being proportioned such that the amount of aluminum halide being fed is at about 0.8 mole percent or less in relation to the molar amount of aromatic monomer units in the anionic styrenic polymer being fed, and such that the dried brominated anionic styrenic polymer referred to in C) hereinafter will have a bromine content in the range of about 67 to about 69 wt %;
  B) deactivating the catalyst in, and washing away bromide ions and catalyst residues from
    1) substantially the entire reaction mixture or
    2) portions of the reaction mixture that have exited from the reaction zone; and
  C) recovering brominated anionic styrenic polymer product from the reaction mixture and drying such product whereby the dried brominated anionic styrenic polymer has a content in the range of about 67 to about 69 wt % and a volatile bromobenzene content which is no more than about 600 ppm (wt/wt);
the process being conducted such that the average residence time in said reaction zone in A) from initial contact of the reactants and catalyst in A) until deactivation of catalyst in B) is about 20 minutes or less.

10. A brominated anionic styrenic polymer as in claim 9 additionally having the following additional properties:
  a) a GPC number average molecular weight in the range of about 10,000 to about 15,000 and a polydispersity of about 1.25 or less; and
  b) an initial ΔE color value of about 3 or less.

11. A brominated anionic styrenic polymer as in claim 9 wherein said volatile bromobenzene content is about 300 ppm or less.

12. A brominated anionic styrenic polymer as in claim 10 wherein said volatile bromobenzene content is about 300 ppm or less.

13. A brominated anionic styrenic polymer as in claim 9 wherein said brominated anionic styrenic polymer is brominated anionic polystyrene.

14. A brominated anionic styrenic polymer as in claim 10 wherein said brominated anionic styrenic polymer is brominated anionic polystyrene.

15. A brominated anionic styrenic polymer as in claim 11 wherein said brominated anionic styrenic polymer is brominated anionic polystyrene.

16. A brominated anionic styrenic polymer as in claim 12 wherein said brominated anionic styrenic polymer is brominated anionic polystyrene.

* * * * *